US008294467B2

(12) United States Patent
Minerbo et al.

(10) Patent No.: US 8,294,467 B2
(45) Date of Patent: Oct. 23, 2012

(54) IMAGING USING DIRECTIONAL RESISTIVITY MEASUREMENTS

(75) Inventors: Gerald Minerbo, Missouri City, TX (US); Sofia Davydycheva, Sugar Land, TX (US); Jian Yang, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 523 days.

(21) Appl. No.: 12/563,569

(22) Filed: Sep. 21, 2009

(65) Prior Publication Data

US 2011/0068798 A1    Mar. 24, 2011

(51) Int. Cl.
G01V 3/10    (2006.01)
G01V 3/18    (2006.01)
(52) U.S. Cl. ...................................................... 324/343
(58) Field of Classification Search .................. None
See application file for complete search history.

(56) References Cited

U.S. PATENT DOCUMENTS

| | | | |
|---|---|---|---|
| 4,899,112 | A | 2/1990 | Clark et al. |
| 5,508,616 | A | 4/1996 | Sato et al. |
| 6,405,136 | B1 * | 6/2002 | Li et al. .......................... 702/10 |
| 6,969,994 | B2 * | 11/2005 | Minerbo et al. ............. 324/343 |

OTHER PUBLICATIONS

M. Bittar et al., "A New Azimuthal Deep-Reading Resistivity Tool for Geosteering and Advanced Formation Evaluation," SPE Annual Technical Conference and Exhibition, Paper SPE 107971 (Nov. 2007), total 9 pages.
R. Chemali et al., "Successful Applications of Azimuthal Propagation Resistivity for Optimum Well Placement and Reservoir Characterization," SPE Annual Technical Conference and Exhibition, Paper SPE 109959 (Nov. 2007), total 12 pages.

* cited by examiner

*Primary Examiner* — Paresh Patel
(74) *Attorney, Agent, or Firm* — Darla P. Fonseca

(57) ABSTRACT

The present disclosure relates to a method to produce an image of a subsurface formation using directional measurements. A downhole logging tool having one or more transmitters and one or more receivers, and being capable of making directional measurements, is used to measure the voltage in a particular receiver due to a particular transmitter for one or more transmitter/receiver pairs, at least one of those voltage measurements being a directional measurement. The complex (phasor) voltage recorded on a receiver coil is divided by the complex voltage recorded at another reference receiver coil. Alternatively, we can use the ratio of a receiver voltage at a particular rotation angle of the tool divided by the voltage on the same receiver when the tool has rotated by an angle of 180 degrees. The information in those ratios is combined to produce images of the resistivity of the subsurface formation surrounding the tool.

8 Claims, 21 Drawing Sheets

IMAGING USING DIRECTIONAL RESISTIVITY MEASUREMENTS

CROSS-REFERENCE TO OTHER APPLICATIONS

Not applicable.

BACKGROUND

1. Technical Field

The present application relates generally to imaging the resistivity of subsurface formations surrounding a wellbore using data obtained with a logging tool, and particularly to imaging using directional resistivity data obtained with an electromagnetic tool used in logging while drilling.

2. Background Art

Logging tools have long been used in wellbores to make, for example, formation evaluation measurements to infer properties of the formations surrounding the borehole and the fluids in the formations. Common logging tools include electromagnetic tools, nuclear tools, and nuclear magnetic resonance (NMR) tools, though various other tool types are also used. Electromagnetic logging tools typically measure the resistivity (or its reciprocal, conductivity) of a formation. Prior art electromagnetic resistivity tools include galvanic tools, induction tools, and propagation tools. With propagation tools, typically a measurement of the attenuation and phase shift of an electromagnetic signal that has passed through the formation is used to determine the resistivity. The resistivity may be that of the virgin formation, the resistivity of what is known as the invasion zone, or it may be the resistivity of the wellbore fluid. In anisotropic formations, the resistivity may be further resolved into components commonly referred to as the vertical resistivity and the horizontal resistivity.

Early logging tools, including electromagnetic logging tools, were run into a wellbore on a wireline cable, after the wellbore had been drilled. Modern versions of such wireline tools are still used extensively. However, the need for information while drilling the borehole gave rise to measurement-while-drilling (MWD) tools and logging-while-drilling (LWD) tools. MWD tools typically provide drilling parameter information such as weight on the bit, torque, temperature, pressure, direction, and inclination. LWD tools typically provide formation evaluation measurements such as resistivity, porosity, and NMR distributions (e.g., T1 and T2). MWD and LWD tools often have characteristics common to wireline tools (e.g., transmitting and receiving antennas), but MWD and LWD tools must be constructed to not only endure but to operate in the harsh environment of drilling.

SUMMARY

The present disclosure relates to a method to produce an image of the resistivity of a subsurface formation using directional measurements. A downhole logging tool having one or more transmitters and one or more receivers, and being capable of making directional measurements, is used to measure the voltage in a particular receiver due to a particular transmitter for one or more transmitter/receiver pairs, at least one of those voltage measurements being a directional measurement. A directional measurement can be obtained by using tilted or transverse coils. The magnetic moment of these coils has a component perpendicular to the tool axis. The complex (phasor) voltage recorded on a receiver coil is divided by the complex voltage recorded at another reference receiver coil. Alternatively, one can use the ratio of a receiver voltage at a particular rotation angle of the tool and the voltage on the same receiver when the tool has rotated by an angle of 180 degrees. The information in such ratios is combined to produce images of the resistivity of the subsurface formation surrounding the tool.

Other aspects and advantages will become apparent from the following description and the attached claims.

It is to be understood that the drawings are to be used to understand various embodiments and/or features. The figures are not intended to unduly limit any present or future claims related to this application.

DETAILED DESCRIPTION

Some embodiments will now be described with reference to the figures. Like elements in the various figures will be referenced with like numbers for consistency. In the following description, numerous details are set forth to provide an understanding of various embodiments and/or features. However, it will be understood by those skilled in the art that some embodiments may be practiced without many of these details and that numerous variations or modifications from the described embodiments are possible. As used here, the terms "above" and "below", "up" and "down", "upper" and "lower", "upwardly" and "downwardly", and other like terms indicating relative positions above or below a given point or element are used in this description to more clearly describe certain embodiments. However, when applied to equipment and methods for use in wells that are deviated or horizontal, such terms may refer to a left to right, right to left, or diagonal relationship as appropriate.

Figure 1:
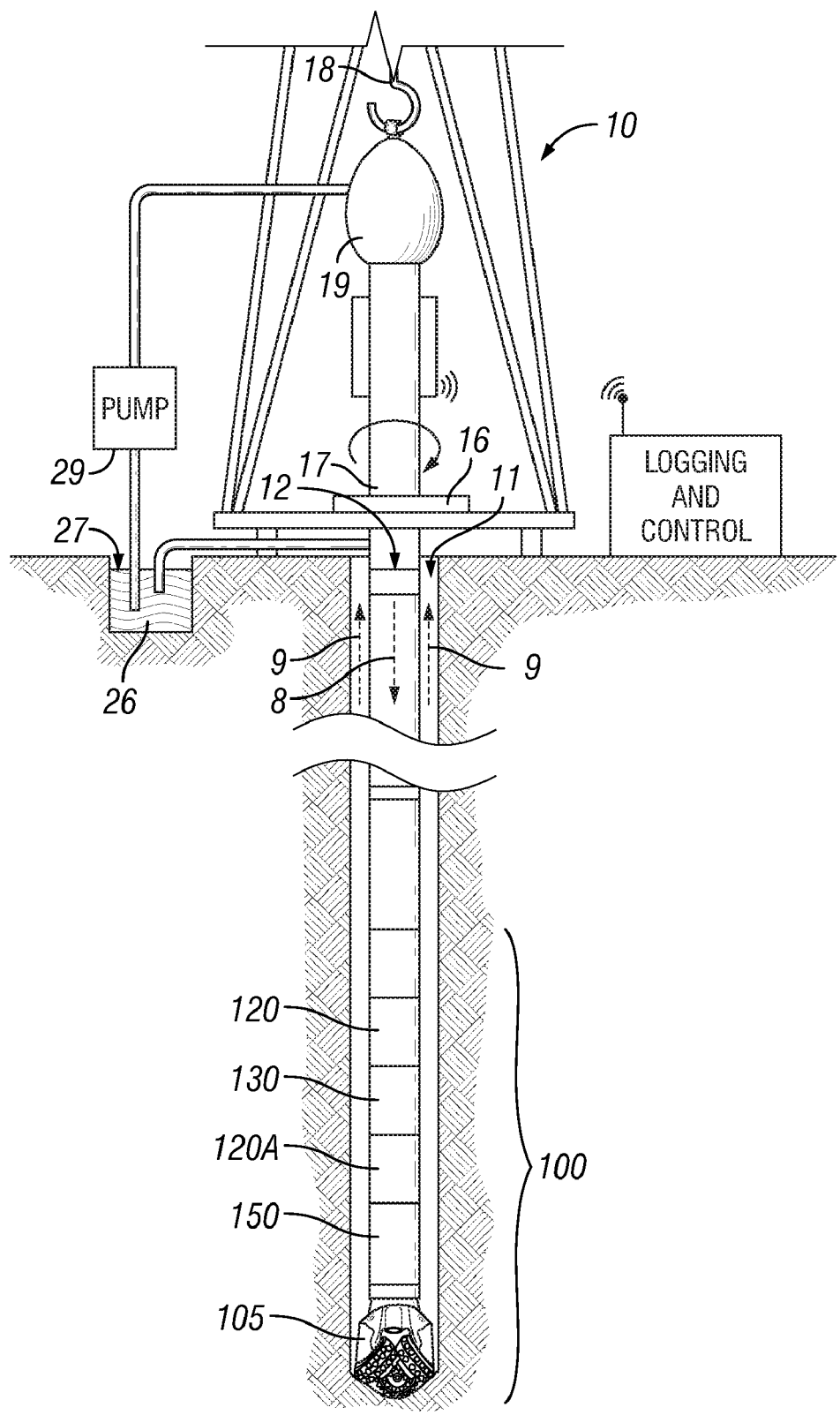
FIG. 1 illustrates an exemplary well site system.

FIG. 1 illustrates a well site system in which various embodiments can be employed. The well site can be onshore or offshore. In this exemplary system, a borehole 11 is formed in subsurface formations by rotary drilling in a manner that is well known. Some embodiments can also use directional drilling, as will be described hereinafter.

A drill string 12 is suspended within the borehole 11 and has a bottom hole assembly 100 which includes a drill bit 105 at its lower end. The surface system includes platform and derrick assembly 10 positioned over the borehole 11, the assembly 10 including a rotary table 16, kelly 17, hook 18 and rotary swivel 19. The drill string 12 is rotated by the rotary table 16, energized by means not shown, which engages the kelly 17 at the upper end of the drill string. The drill string 12 is suspended from a hook 18, attached to a traveling block (also not shown), through the kelly 17 and a rotary swivel 19 which permits rotation of the drill string relative to the hook. As is well known, a top drive system could alternatively be used.

In the example of this embodiment, the surface system further includes drilling fluid or mud 26 stored in a pit 27 formed at the well site. A pump 29 delivers the drilling fluid 26 to the interior of the drill string 12 via a port in the swivel 19, causing the drilling fluid to flow downwardly through the drill string 12 as indicated by the directional arrow 8. The drilling fluid exits the drill string 12 via ports in the drill bit 105, and then circulates upwardly through the annulus region between the outside of the drill string and the wall of the borehole, as indicated by the directional arrows 9. In this well known manner, the drilling fluid lubricates the drill bit 105 and carries formation cuttings up to the surface as it is returned to the pit 27 for recirculation.

The bottom hole assembly 100 of the illustrated embodiment includes a logging-while-drilling (LWD) module 120, a measuring-while-drilling (MWD) module 130, a roto-steerable system and motor, and drill bit 105.

The LWD module 120 is housed in a special type of drill collar, as is known in the art, and can contain one or a plurality of known types of logging tools. It will also be understood that more than one LWD and/or MWD module can be employed, e.g. as represented at 120A. (References, throughout, to a module at the position of 120 can alternatively mean a module at the position of 120A as well.) The LWD module includes capabilities for measuring, processing, and storing information, as well as for communicating with the surface equipment. In the present embodiment, the LWD module includes a resistivity measuring device.

The MWD module 130 is also housed in a special type of drill collar, as is known in the art, and can contain one or more devices for measuring characteristics of the drill string and drill bit. The MWD tool further includes an apparatus (not shown) for generating electrical power to the downhole system. This may typically include a mud turbine generator powered by the flow of the drilling fluid, it being understood that other power and/or battery systems may be employed. In the present embodiment, the MWD module includes one or more of the following types of measuring devices: a weight-on-bit measuring device, a torque measuring device, a vibration measuring device, a shock measuring device, a stick/slip measuring device, a direction measuring device, and an inclination measuring device.

Figure 2:
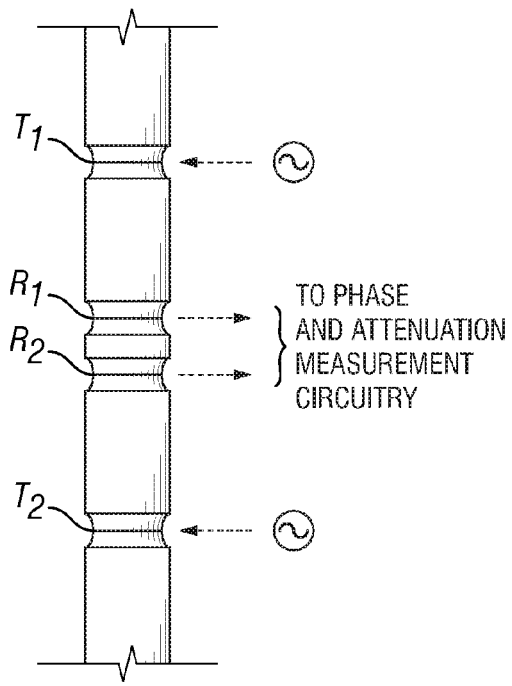
FIG. 2 shows a prior art electromagnetic logging tool.

An example of a tool which can be the LWD tool 120, or can be a part of an LWD tool suite 120A of the system and method hereof, is the dual resistivity LWD tool disclosed in U.S. Pat. No. 4,899,112 and entitled "Well Logging Apparatus And Method For Determining Formation Resistivity At A Shallow And A Deep Depth," incorporated herein by reference. As seen in FIG. 2, upper and lower transmitting antennas, $T_1$ and $T_2$, have upper and lower receiving antennas, $R_1$ and $R_2$, therebetween. The antennas are formed in recesses in a modified drill collar and mounted in insulating material. The phase shift of electromagnetic energy as between the receivers provides an indication of formation resistivity at a relatively shallow depth of investigation, and the attenuation of electromagnetic energy as between the receivers provides an indication of formation resistivity at a relatively deep depth of investigation. The above-referenced U.S. Pat. No. 4,899,112 can be referred to for further details. In operation, attenuation-representative signals and phase-representative signals are coupled to a processor, an output of which is coupleable to a telemetry circuit.

Recent electromagnetic logging tools use one or more tilted or transverse antennas, with or without axial antennas. Those antennas may be transmitters or receivers. A tilted antenna is one whose dipole moment is neither parallel nor perpendicular to the longitudinal axis of the tool. A transverse antenna is one whose dipole moment is perpendicular to the longitudinal axis of the tool, and an axial antenna is one whose dipole moment is parallel to the longitudinal axis of the tool. Two antennas are said to have equal angles if their dipole moment vectors intersect the tool's longitudinal axis at the same angle. For example, two tilted antennas have the same tilt angle if their dipole moment vectors, having their tails conceptually fixed to a point on the tool's longitudinal axis, lie on the surface of a right circular cone centered on the tool's longitudinal axis and having its vertex at that reference point. Transverse antennas obviously have equal angles of 90 degrees, and that is true regardless of their azimuthal orientations relative to the tool.

Electromagnetic logging tools having tilted or transverse coils may be used to produce two-dimensional images of the formation resistivity, as disclosed in U.S. Pat. No. 5,508,616. That patent is directed to a wireline induction tool. Similar resistivity imaging techniques were discussed in the following two publications: (1) M. Bittar, J. Klein, R. Beste, G. Hu, M. Wu, J. Pitcher, C. Golla, G. Althoff, M. Sitka, V. Minosyam, and M. Paulk, A New Azimuthal Deep-Reading Resistivity Tool for Geosteering and Advanced Formation Evaluation, SPE Annual Technical Conference and Exhibition, Paper SPE 107971, November 2007, and (2) R. Chemali, E. Hart, T. Flynn, H. Meyer, T. Helgesen, A. Kirkwood, A. Merchant, and A. E. Berle, Successful Applications of Azimuthal Propagation Resistivity for Optimum Well Placement and Reservoir Characterization, SPE Annual Technical Conference and Exhibition, Paper SPE 109959, November 2007. Those publications are applicable to directional LWD propagation tools.

Figure 3:
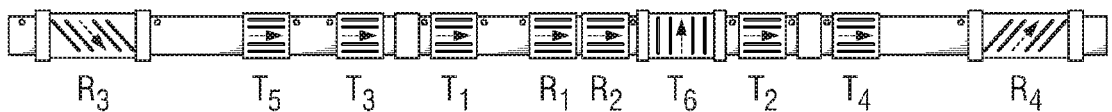
FIG. 3 shows a prior art electromagnetic logging tool capable of making directional measurements.

FIG. 3 shows a prior art electromagnetic logging tool having five axially aligned transmitters T1, T2, T3, T4, T5, two axially aligned receivers R1, R2, two tilted receiver R3, R4, and one transverse transmitter T6. The tilted receivers R3 and R4 both have a tilt angle of 45 degrees, but are azimuthally offset by 90 degrees. The dipole moments of the tilted antennas are shown in the same plane, but the dipole moment of R4 in fact has a component perpendicular to the plane (out of the page). The antenna spacings shown are but one example of possible spacings, though different measurements can be made or parameters computed depending on the relative positions of the antennas. Due to the tilted receivers the tool has a directional sensitivity, i.e. its directional measurements vary as the tool rotates if the surrounding formation is not axially symmetric.

In one exemplary embodiment, directional measurements using the tilted receivers may be performed as follows. As the tool rotates, the voltages in the tilted receivers excited by an axial transmitter vary as a function of the rotation angle, having maximal and minimal values at a certain angle $\phi_d$. For ease of discussion, we will call these maximal and minimal voltages $V_{up}$ and $V_{down}$, respectively, since they can be associated with the direction of the formation layering, which is typically horizontal.

Thus, the voltage in a tilted receiver coils excited by an axial transmitter coil can be represented as the following functions of the rotation angle:

$$V_{zt}(\phi) = A_0 + A_1\cos\phi + B_1\sin\phi \qquad (1)$$
$$= \frac{1}{2}(V_{up} + V_{down}) + \frac{1}{2}(V_{up} - V_{down})\cos(\phi - \phi_d),$$

where the coefficients $A_0$, $A_1$ and $B_1$ can easily be obtained from the voltages $V_{up}$ and $V_{down}$. Directional resistivity images may be obtained by first constructing, from the measured voltages, ratios of the form $$V_{zt}(\phi)/V_{zt}(\phi+\pi). \qquad (2)$$

These ratios are functions of the logging tool depth and the tool rotation angle $\phi$. These ratios do not require calibration of the tilted receiver coils, as the coil response may be assumed to be constant during a rotation of the tool by 180 degrees.

For example, various images may be constructed using the following voltage ratios:
T4R3 and T5R4 for 96 inch spacing:

$$V_{43zt}(\phi)/V_{43zt}(\phi+\pi), \qquad (3)$$

$$V_{54zt}(\phi)/V_{54zt}(\phi+\pi), \qquad (4)$$

T2R3 and T3R4 for 84 inch spacing:

$$V_{23zt}(\phi)/V_{23zt}(\phi+\pi), \qquad (5)$$

$$V_{34zt}(\phi)/V_{34zt}(\phi+\pi), \qquad (6)$$

and T2R4 and T3R3 for 34 inch spacing:

$$V_{24zt}(\phi)/V_{24zt}(\phi+\pi), \qquad (7)$$

$$V_{33zt}(\phi)/_{33zt}(\phi+\pi). \qquad (8)$$

As will be discussed below, improved resistivity images may be obtained by symmetrizing these ratios. The symmetrized ratios produce sharper images at bed boundaries, especially in the presence of anisotropy. Combinations of two pairs of transmitters and receivers having the same spacing are used, as follows:
For 94 inch spacing:

$$V_{43zt}(\phi)/V_{43zt}(\phi+\pi)/[V_{54zt}(\phi+\pi)], \qquad (9)$$

For 84 inch spacing:

$$V_{23zt}(\phi)/V_{23zt}(\phi+\pi)/[V_{34zt}(\phi)/V_{34zt}(\phi+\pi)], \qquad (10)$$

and for 34 inch spacing:

$$V_{24zt}(\phi)/V_{24zt}(\phi+\pi)/[V_{33zt}(\phi)/V_{33zt}(\phi+\pi)]. \qquad (11)$$

Further, we re-normalize the measurements to conductivity units. At a layer boundary, at a high dip angle, the re-normalized image gives the difference in conductivity $\Delta\sigma=\sigma_1-\sigma_2$, between the near layer (conductivity $\sigma_1$) and the approaching layer (conductivity $\sigma_2$).

FIGS. 4A-6G illustrate how such imaging works in different formations. FIGS. 4B-4G correspond to the two-layer formation shown in FIG. 4A. A 1 ohm-meter conductive shale overlays a 10 ohm-meter resistive sand, and a wellbore penetrates both layers. The measurement frequency is 100 kHz. The dip angle is 85 degrees.

Figure 4A:
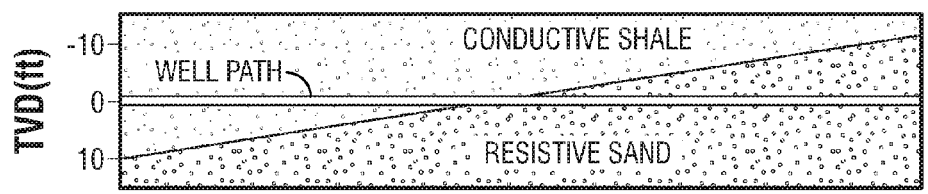
FIG. 4A is a schematic illustration of an exemplary two layer isotropic formation. The layer resistivities are 1 and 10 ohm-meters.
Figure 4B:
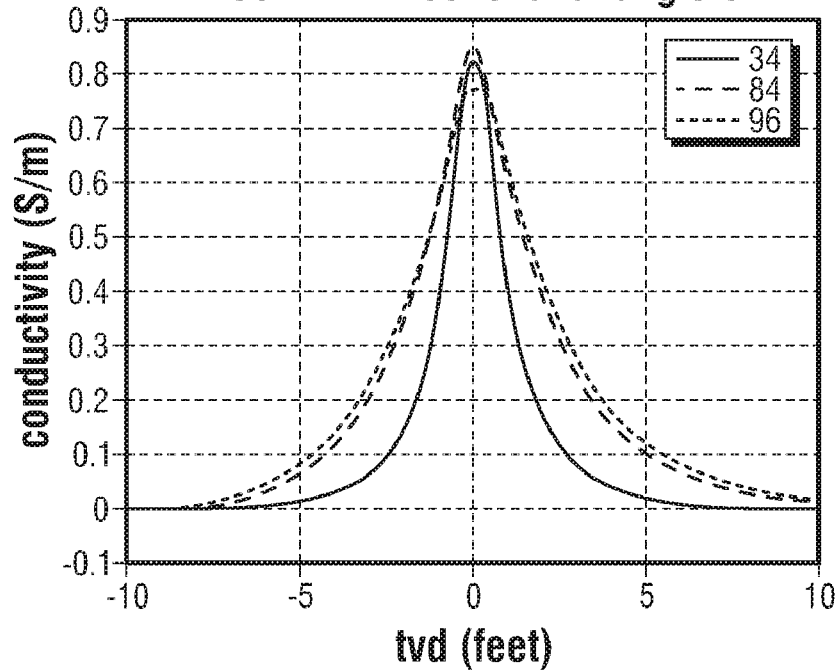
FIGS. 4B and 4C are plots depicting the symmetrized and unsymmetrized directional measurements at azimuthal angle $\phi=0$ of the 34, 84, and 96 inch spacings as functions of the distance from the bed boundary for the formation of FIG. 4A, in accordance with the present disclosure.
Figure 4C:
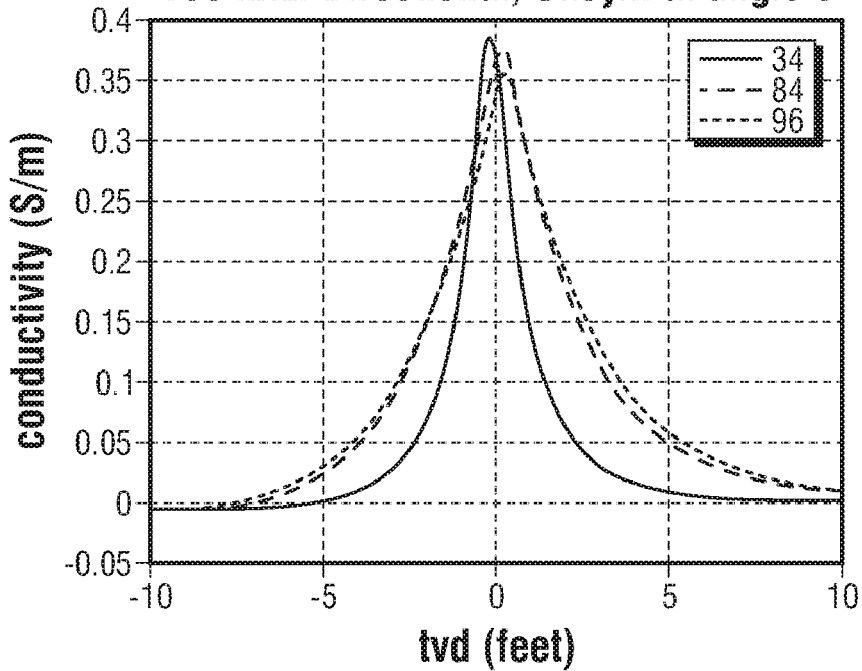
Figure 4D:
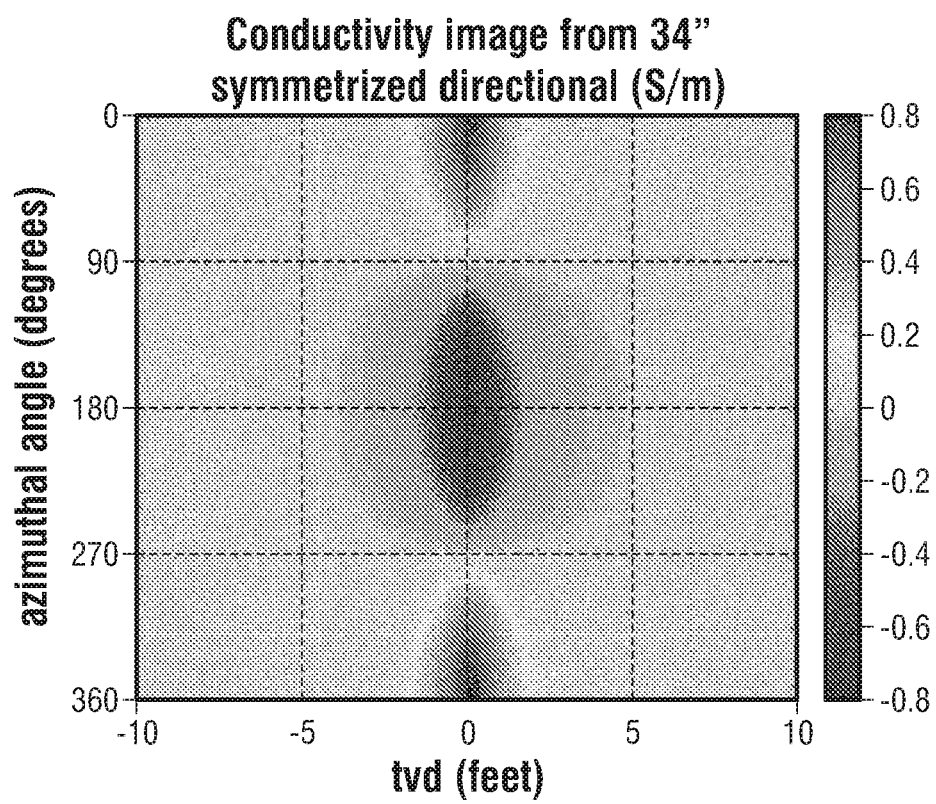
FIGS. 4D and 4E are images depicting the symmetrized and unsymmetrized directional measurements of the 34 inch spacing as functions of the distance to bed boundary and the azimuthal angle $\phi$ for the formation of FIG. 4A, in accordance with the present disclosure.
Figure 4E:
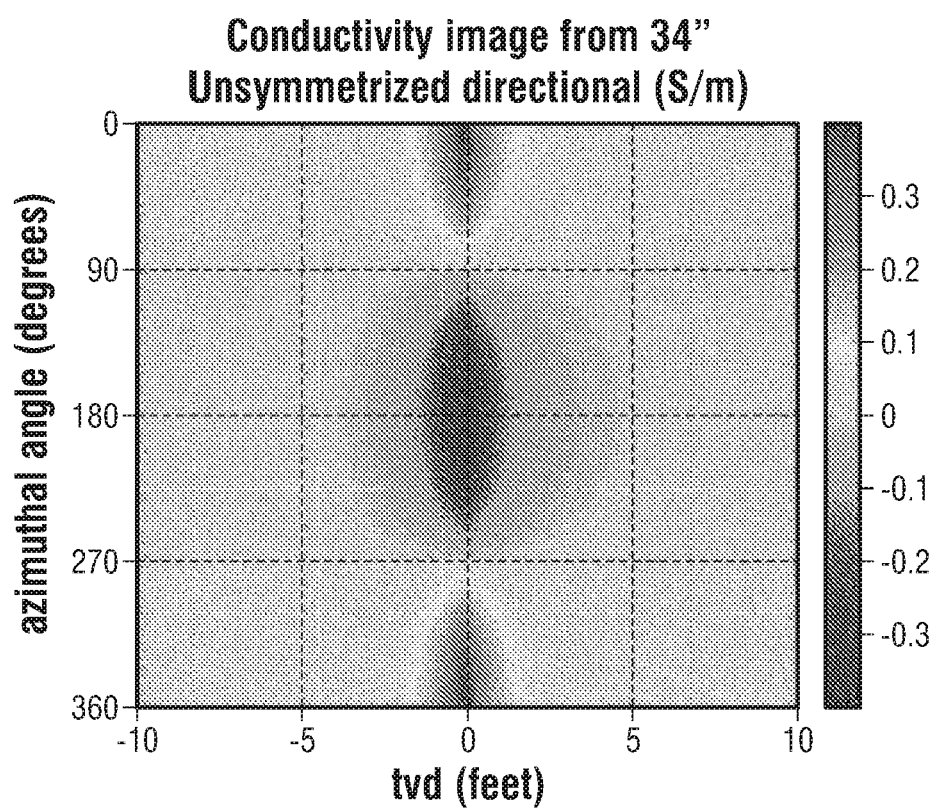
Figure 4F:
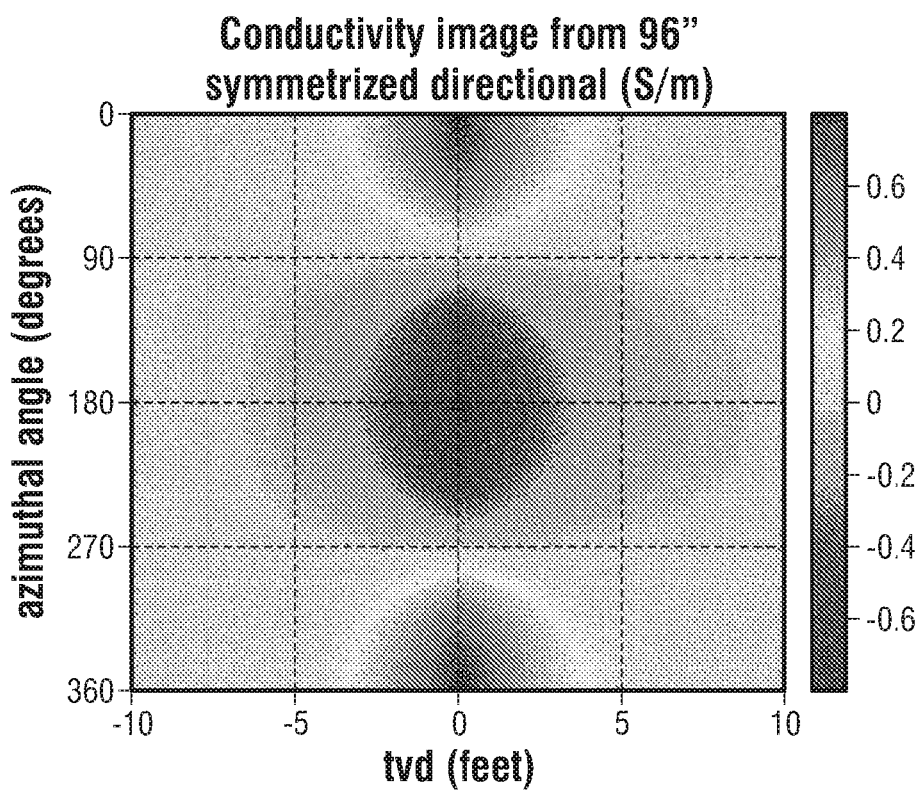
FIGS. 4F and 4G are images depicting the symmetrized and unsymmetrized directional measurements of the 96 inch spacing as functions of the distance to bed boundary and the azimuthal angle $\phi$ for the formation of FIG. 4A, in accordance with the present disclosure.
Figure 4G:
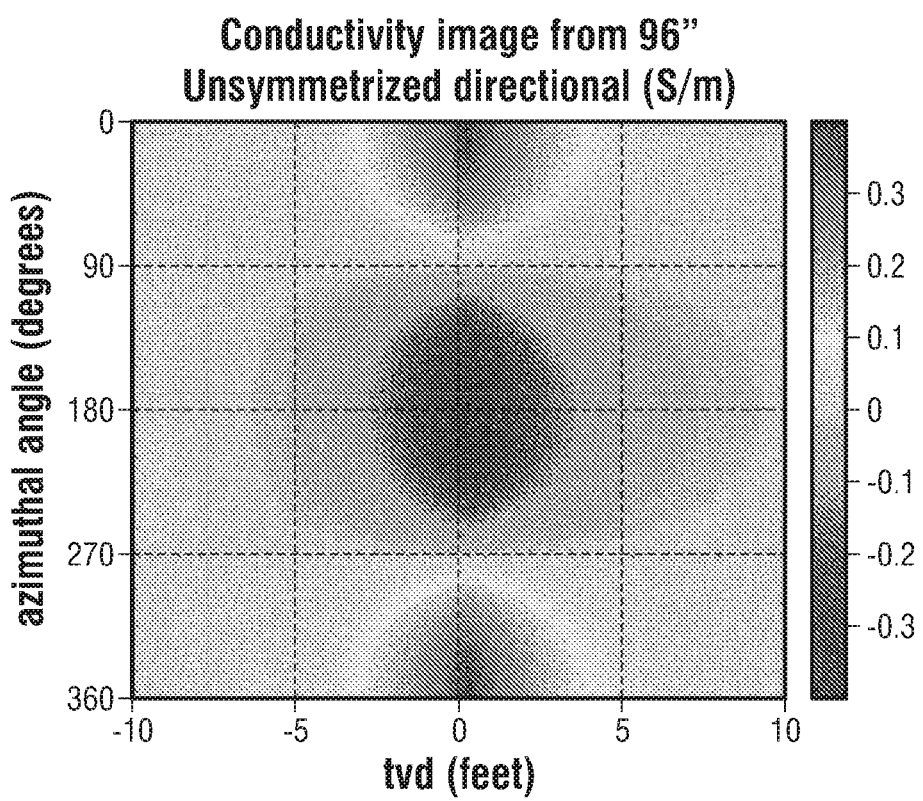

The curve plots (FIGS. 4B, 4C) depict the symmetrized and unsymmetrized directional measurements at azimuthal angle $\phi=0$ of the 34, 84, and 96 inch spacings as functions of the distance from the bed boundaries. The images of FIGS. 4D and 4E depict the symmetrized and unsymmetrized directional measurements of the 34 inch spacing as functions of the distance to bed boundary and the azimuthal angle $\phi$. Similarly, the images of FIGS. 4F and 4G depict the symmetrized and unsymmetrized directional measurements of the 96 inch spacing. The image measurements are re-normalized to conductivity units, so they depict the difference in conductivities, as described above. The images enable one to detect an approaching bed from a distance of a few feet, and to visualize its orientation.

Figure 5A:
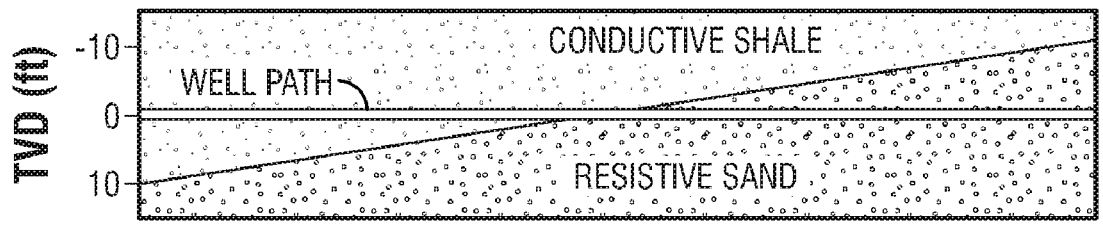
FIG. 5A is an anisotropic version of the two-layer formation of FIG. 4A. The horizontal resistivities of the layers are Rh=1, 10; the vertical resistivities are Rv=2, 20 ohm-meters.
Figure 5B:
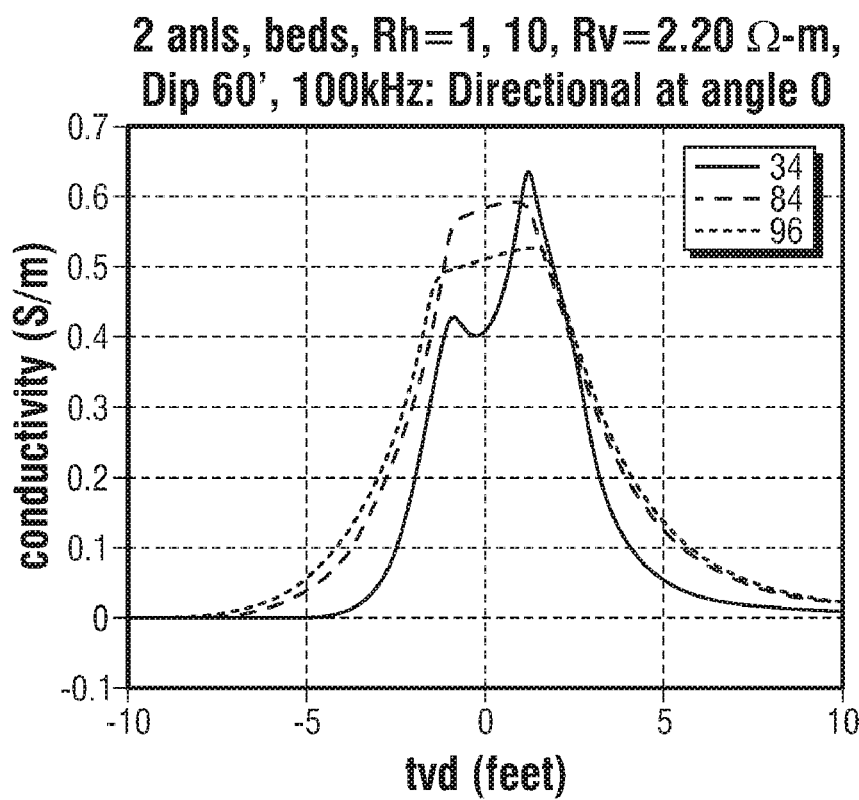
FIGS. 5B and 5C are plots depicting the symmetrized and unsymmetrized directional measurements at azimuthal angle $\phi=0$ of the 34, 84, and 96 inch spacings as functions of the distance from the bed boundaries for the formation of FIG. 5A, in accordance with the present disclosure.
Figure 5C:
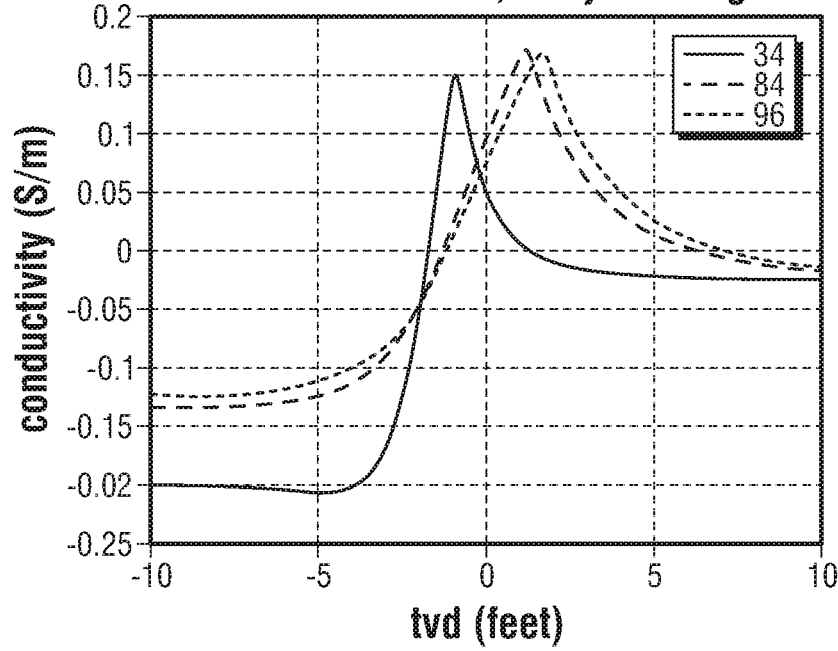
Figure 5D:
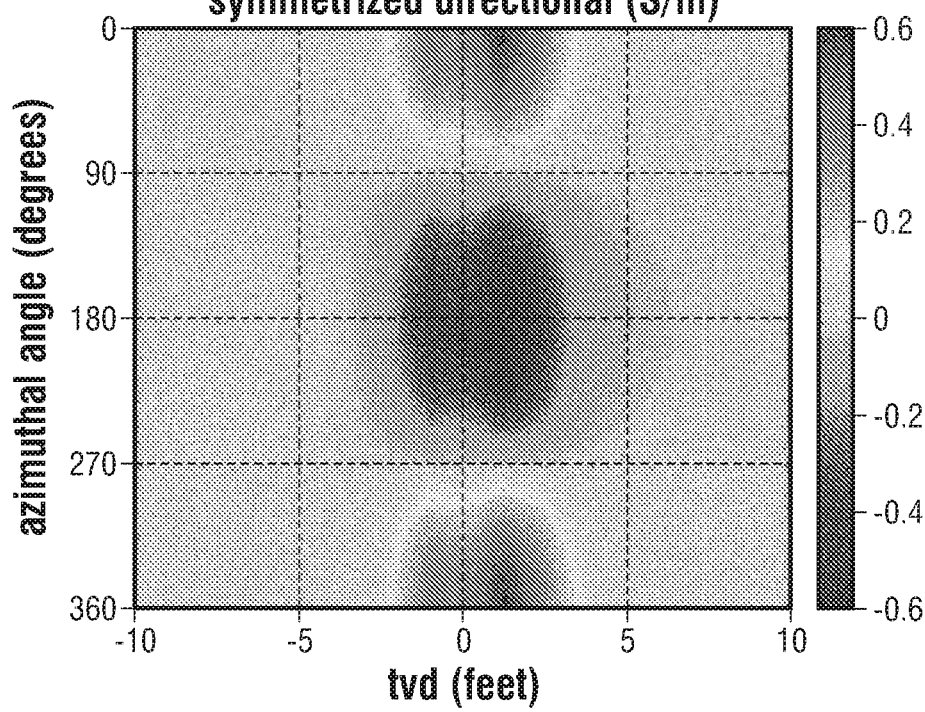
FIGS. 5D and 5E are images depicting the symmetrized and unsymmetrized directional measurements of the 34 inch spacing as functions of the distance to bed boundary and the azimuthal angle $\phi$ for the formation of FIG. 5A, in accordance with the present disclosure.
Figure 5E:
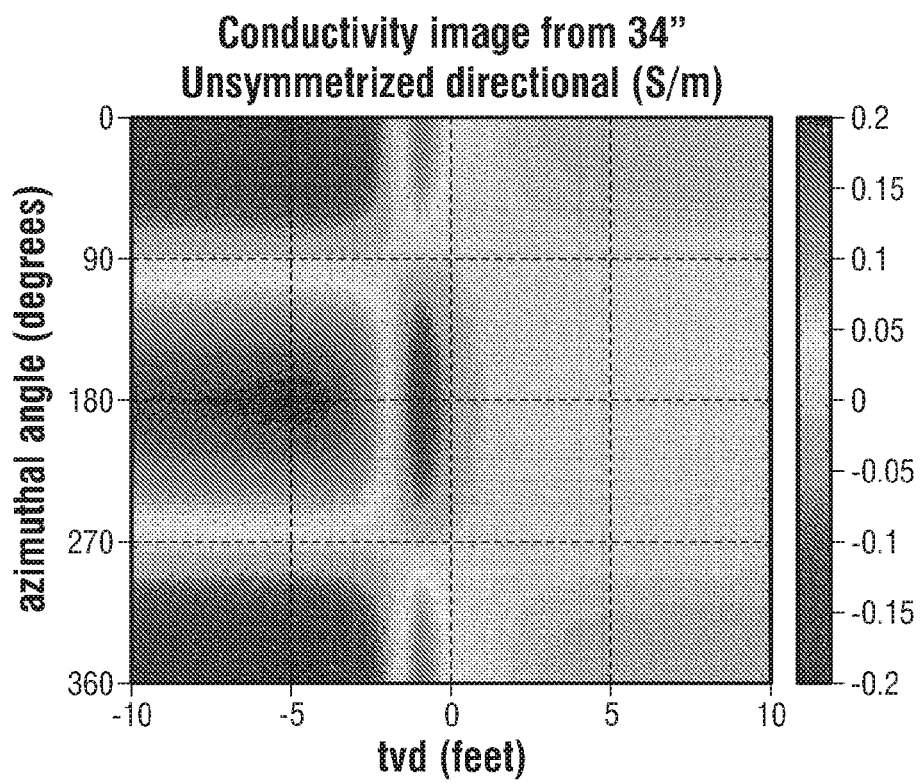
Figure 5F:
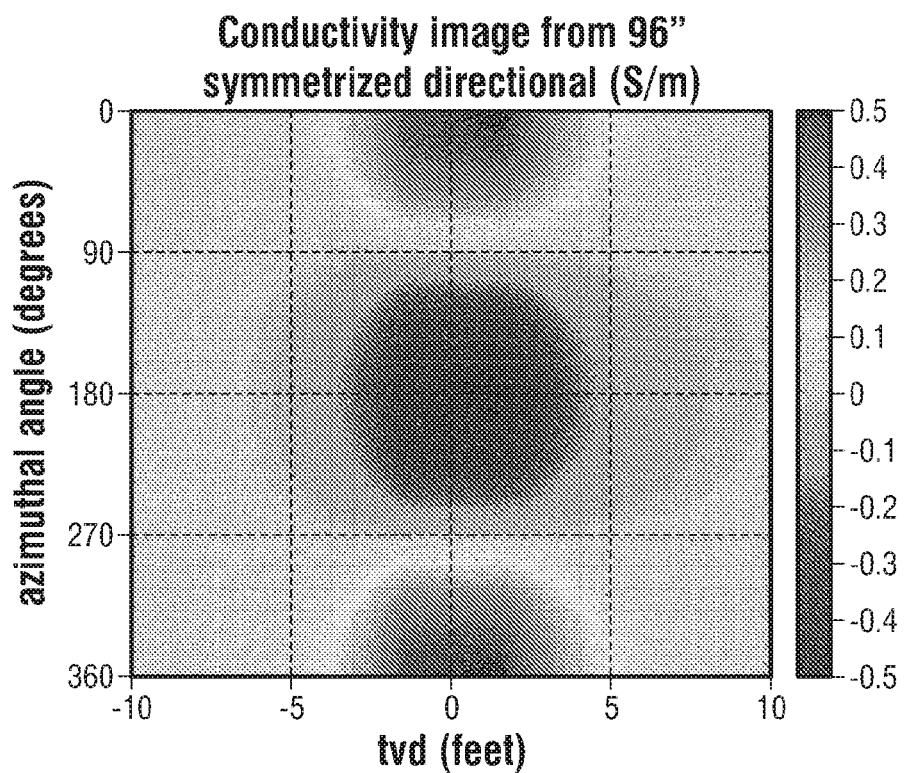
FIGS. 5F and 5G are images depicting the symmetrized and unsymmetrized directional measurements of the 96 inch spacing as functions of the distance to bed boundary and the azimuthal angle $\phi$ for the formation of FIG. 5A, in accordance with the present disclosure.
Figure 5G:
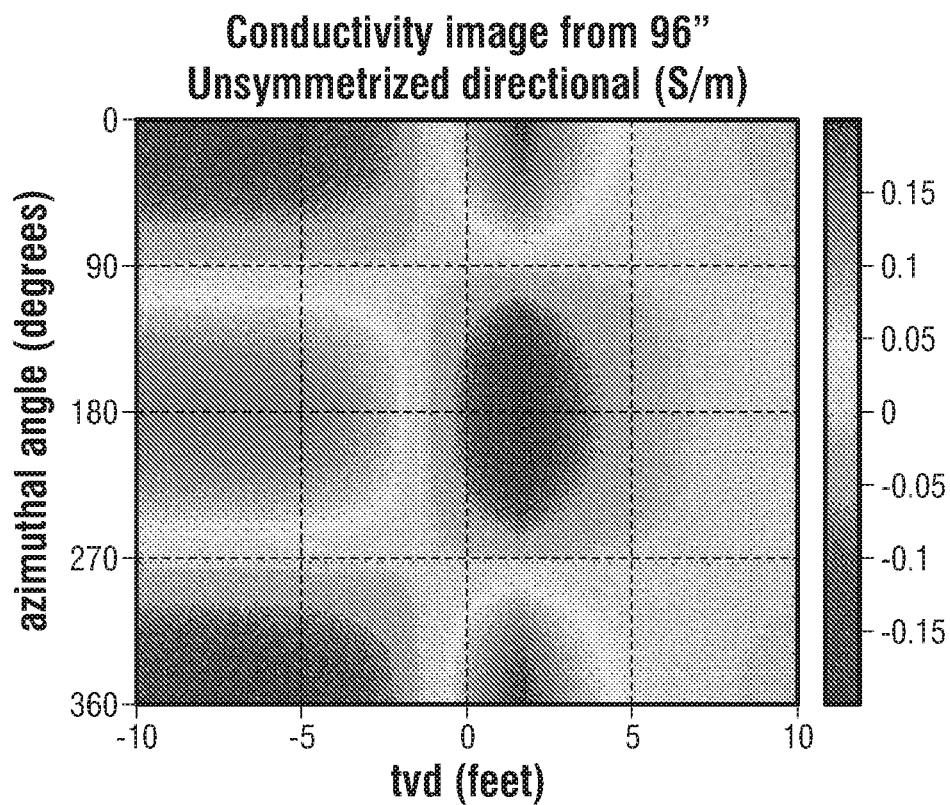

FIGS. 5A-5G display similar information, but the formation of FIG. 5A is an anisotropic two-layer formation. In this example, the horizontal resistivity equals 1 ohm-meter in the conductive shale, and equals 10 ohm-meters in the resistive sand. The vertical resistivity equals 2 ohm-meters in the shale, and equals 20 ohm-meters in the sand. Again the measurement frequency is 100 kHz; the dip angle is 85 degrees. The curve plots (FIGS. 5B, 5C) depict the symmetrized and unsymmetrized directional measurements at azimuthal angle $\phi=0$ of the 34, 84, and 96 inch spacings as functions of the distance from the bed boundaries. The images of FIGS. 5D and 5E depict the symmetrized and unsymmetrized directional measurements of the 34 inch spacing as functions of the distance to bed boundary and the azimuthal angle $\phi$. Similarly, the images of FIGS. 5F and 5G depict the symmetrized and unsymmetrized directional measurements of the 96 inch spacing. The improvement produced by symmetrization is seen in FIG. 5F compared with FIG. 5G.

Figure 6A:
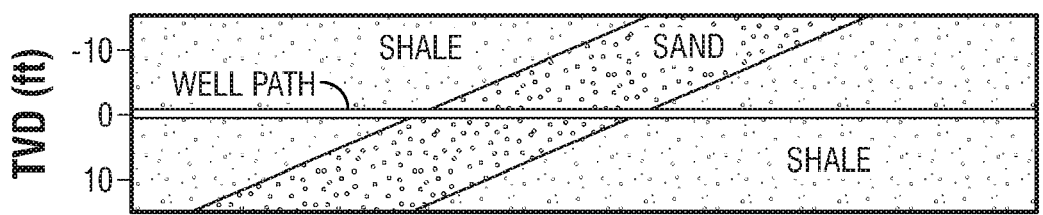
FIG. 6A is an anisotropic three-layer formation. The horizontal resistivities of the layers are Rh=1, 50, 1; the vertical resistivities are 1, 100, 1 ohm-meters.
Figure 6B:
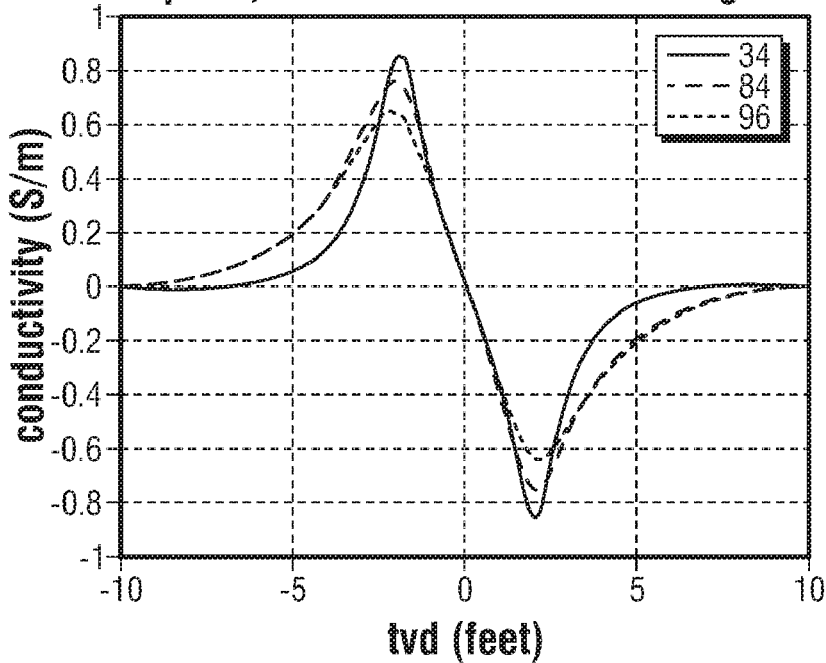
FIGS. 6B and 6C are plots depicting the symmetrized and unsymmetrized directional measurements at azimuthal angle $\phi=0$ of the 34, 84, and 96 inch spacings as functions of the distance from the bed boundaries for the formation of FIG. 6A, in accordance with the present disclosure.
Figure 6C:
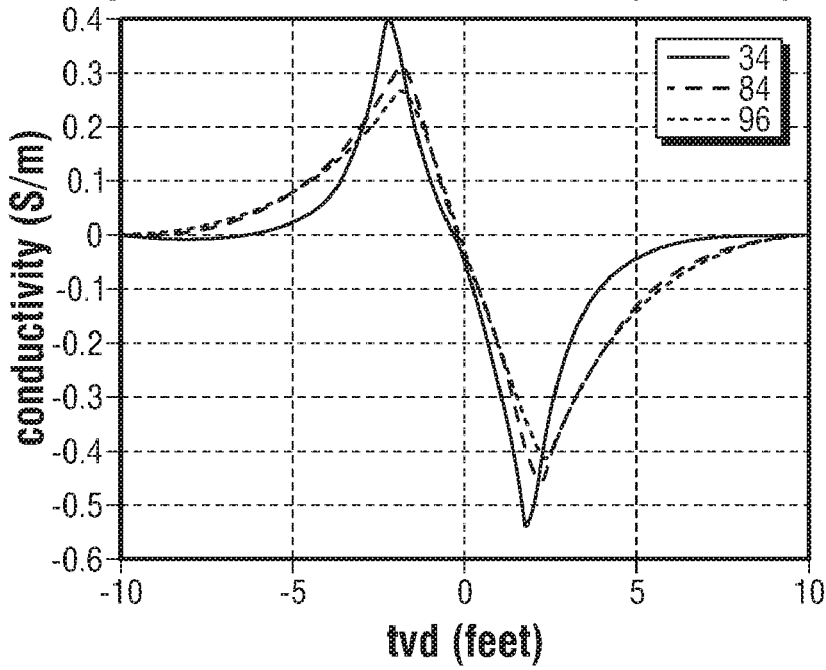
Figure 6D:
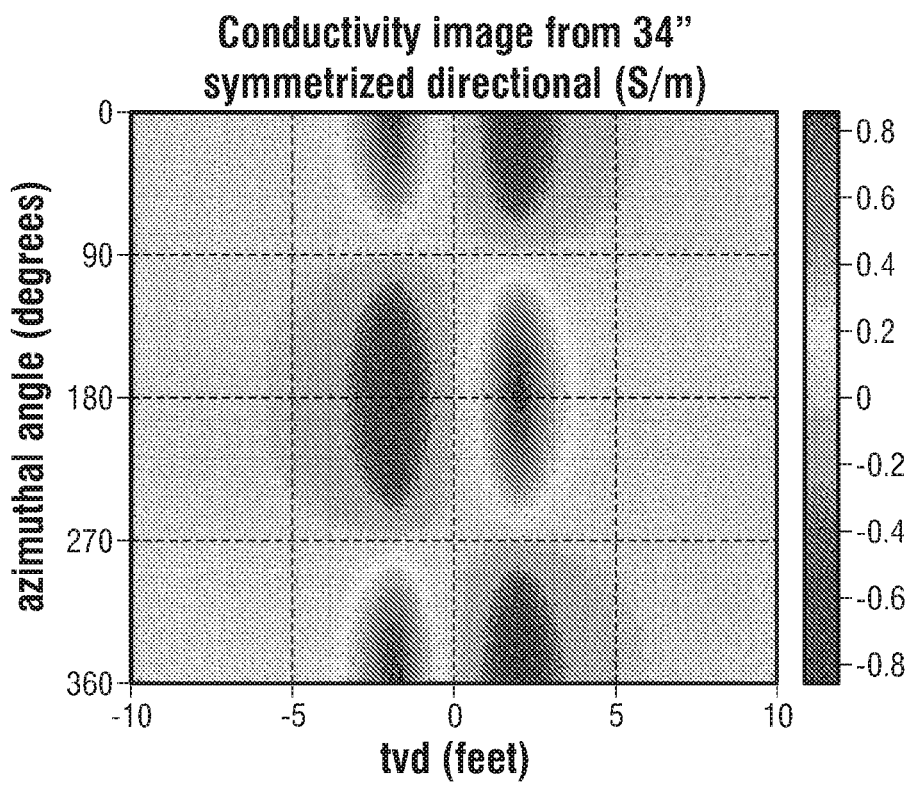
FIGS. 6D and 6E are images depicting the symmetrized and unsymmetrized directional measurements of the 34 inch spacing as functions of the distance to bed boundary and the azimuthal angle $\phi$ for the formation of FIG. 6A, in accordance with the present disclosure.
Figure 6E:
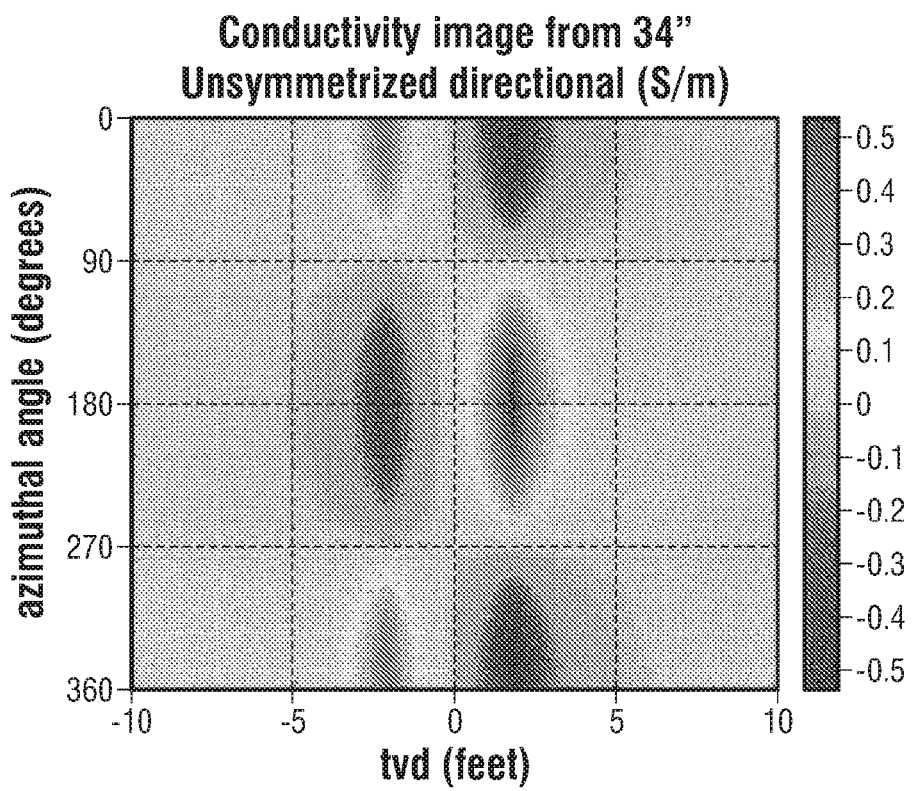
Figure 6F:
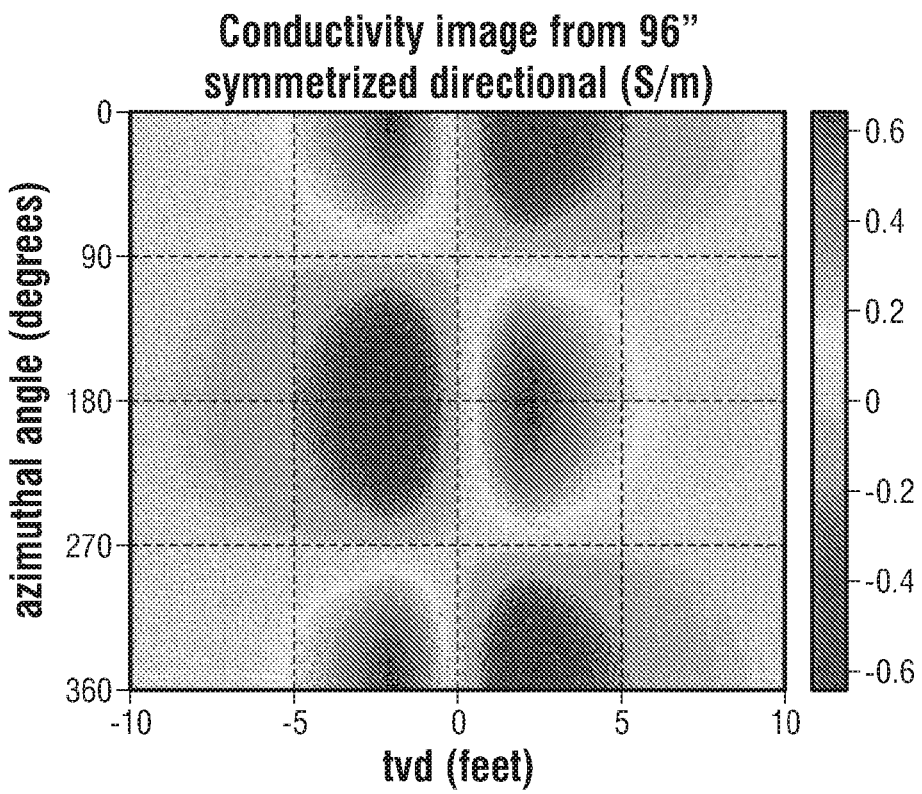
FIGS. 6F and 6G are images depicting the symmetrized and unsymmetrized directional measurements of the 96 inch spacing as functions of the distance to bed boundary and the azimuthal angle φ for the formation of FIG. 6A, in accordance with the present disclosure.
Figure 6G:
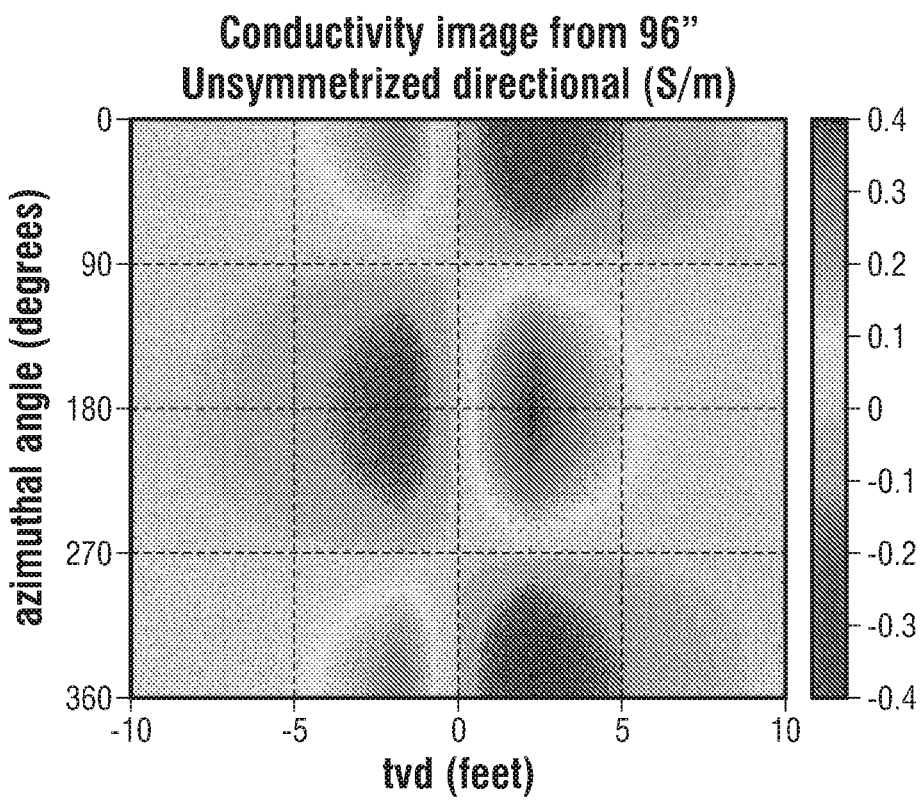

FIG. 6A shows a three layer formation having an anisotropic resistive sand layer between two isotropic conductive shale layers. The horizontal resistivity of the sand layer is 50 ohm-meters, and the vertical resistivity is 100 ohm-meters. The resistivity of the shale layers is 1 ohm-meter. The plots (FIGS. 6B, 6C) depict the symmetrized and unsymmetrized directional measurements at azimuthal angle $\phi=0$ of the 34, 84, and 96 inch spacings as functions of the distance from the bed boundaries. The images of FIGS. 6D and 6E depict the symmetrized and unsymmetrized directional measurements of the 34 inch spacing as functions of the distance to bed boundary and the azimuthal angle $\phi$. As before, the images of FIGS. 6F and 6G depict the symmetrized and unsymmetrized directional measurements of the 96 inch spacing.

Another kind of image that can be constructed using directional measurements involves the voltages in the one of the tilted receivers (R3 or R4) and the voltage in the axial receiver R1, excited by the same axial transmitter (e.g., T4 or T5 for 96 and 37 inch spacings), in the following ratios:

$$V_{43zt}/V_{41zz} \quad (12)$$

$$V_{54zt}/V_{51zz} \quad (13)$$

The images obtained from these ratios can be interpreted more readily. However these ratios require calibration of the tilted receiver coils. Their calibration can be adjusted by the tool software with an accuracy that is adequate for imaging. To improve the behavior at bed boundaries, these measurements can be symmetrized as follows:

$$V_{43zt}/V_{41zz}[V_{54zt}/V_{51zz}]. \quad (14)$$

To associate these measurements with the formation conductivity, $\sigma$, one can apply a simple inversion of those data using an analytical formula for $V_{zz}(\sigma)$ assuming point dipole coils in a homogeneous medium.

Similar, but different, images can be constructed using directional measurements by forming the ratio of voltages in the same tilted receiver (e.g., R3 or R4) excited by two different axial transmitters (e.g., T4 and T3, or T5 and T2 for 96 inch and 34 inch spacings), as shown below:

$$V_{43zt}/V_{33zt}, \quad (15)$$

$$V_{54zt}/V_{24zt}. \quad (16)$$

They can be symmetrized in a similar way to improve the behavior at bed boundaries:

$$V_{43zt}/N_{33zt}/[V_{54zt}/V_{24zt}]. \quad (17)$$

Figure 7A:
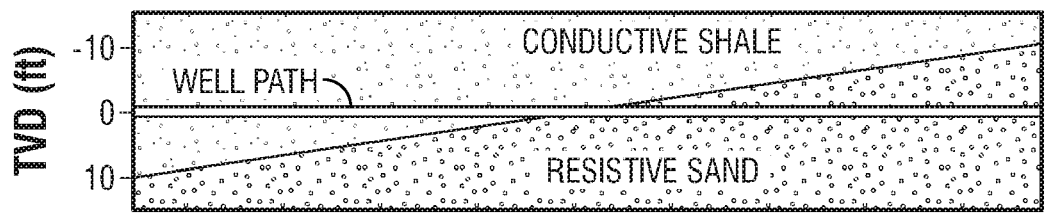
FIG. 7A shows the same formation as FIG. 4A.
Figure 7B:
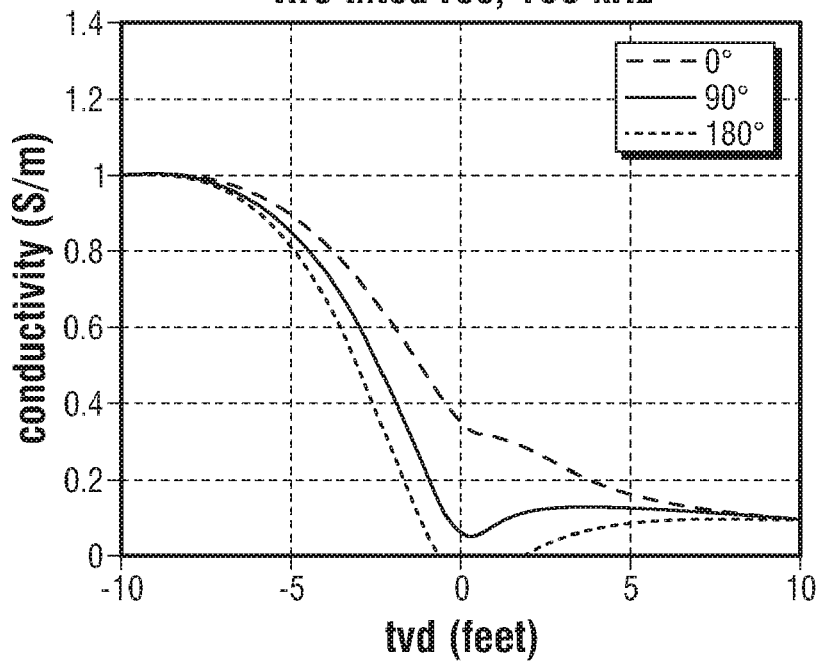
FIGS. 7B and 7D are plots depicting the symmetrized directional measurements as functions of the distance to bed boundary for azimuthal angles φ equal to 0, 90, and 180 degrees for the formation of FIG. 7A, in accordance with the present disclosure.
Figure 7C:
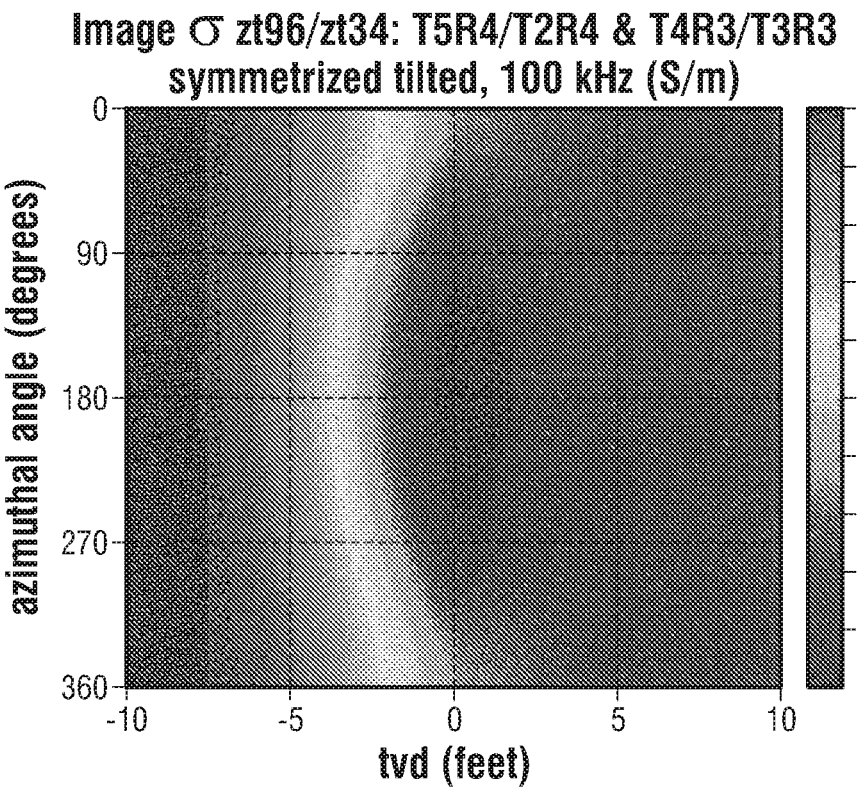
FIGS. 7C and 7E are images depicting the symmetrized directional measurements as functions of the distance to bed boundary and the azimuthal angle φ for the formation of FIG. 7A, in accordance with the present disclosure.
Figure 7D:
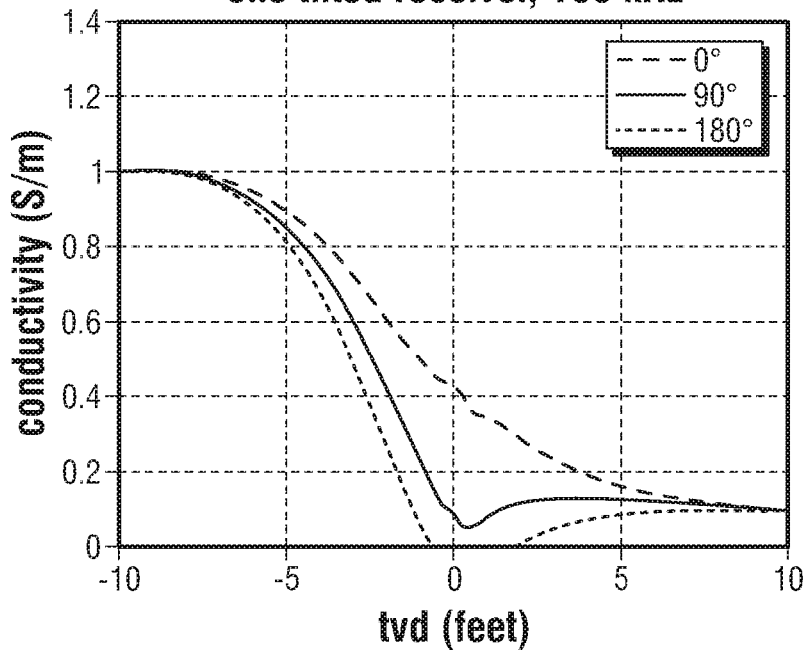
Figure 7E:
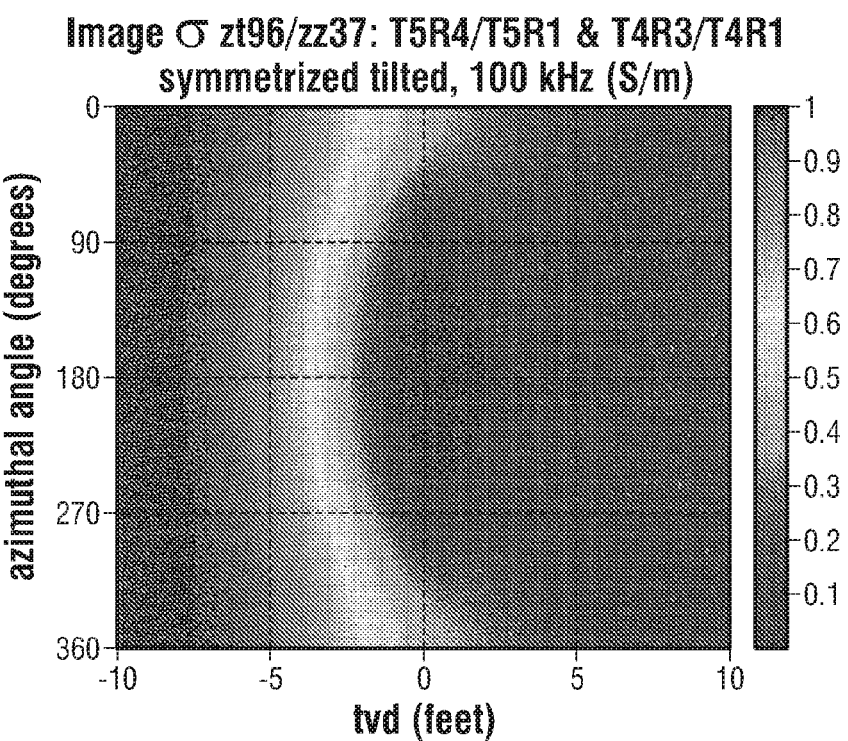
Figure 8A:
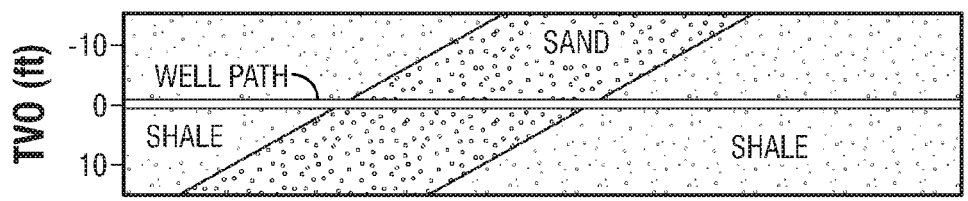
FIG. 8A shows the same formation as FIG. 6A.
Figure 8B:
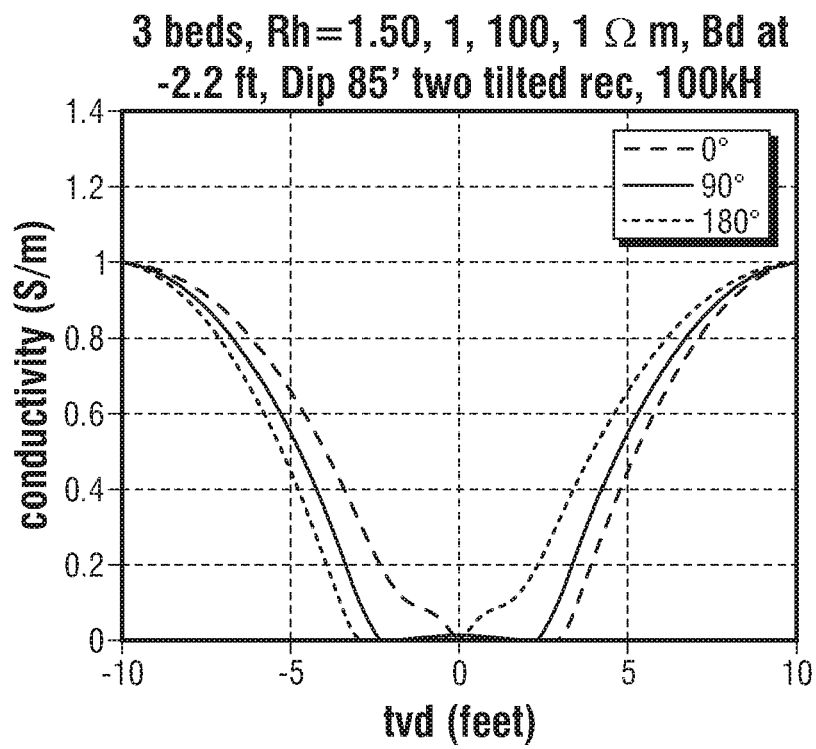
FIGS. 8B and 8D are plots depicting the symmetrized directional measurements as functions of the distance to bed boundary for azimuthal angles φ equal to 0, 90, and 180 degrees for the formation of FIG. 8A, in accordance with the present disclosure.
Figure 8C:
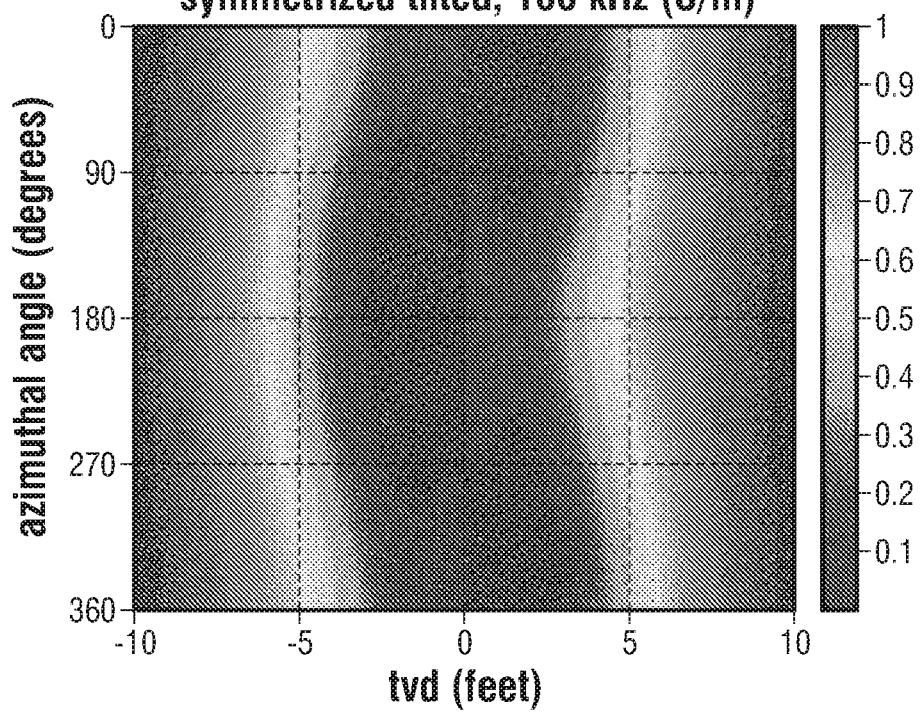
FIGS. 8C and 8E are images depicting the symmetrized directional measurements as functions of the distance to bed boundary and the azimuthal angle φ for the formation of FIG. 8A, in accordance with the present disclosure.
Figure 8D:
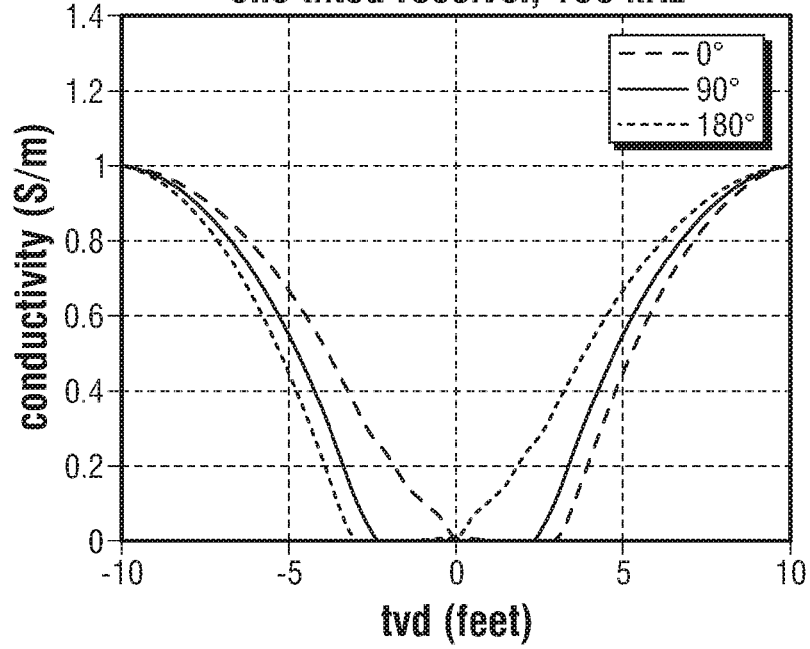
Figure 8E:
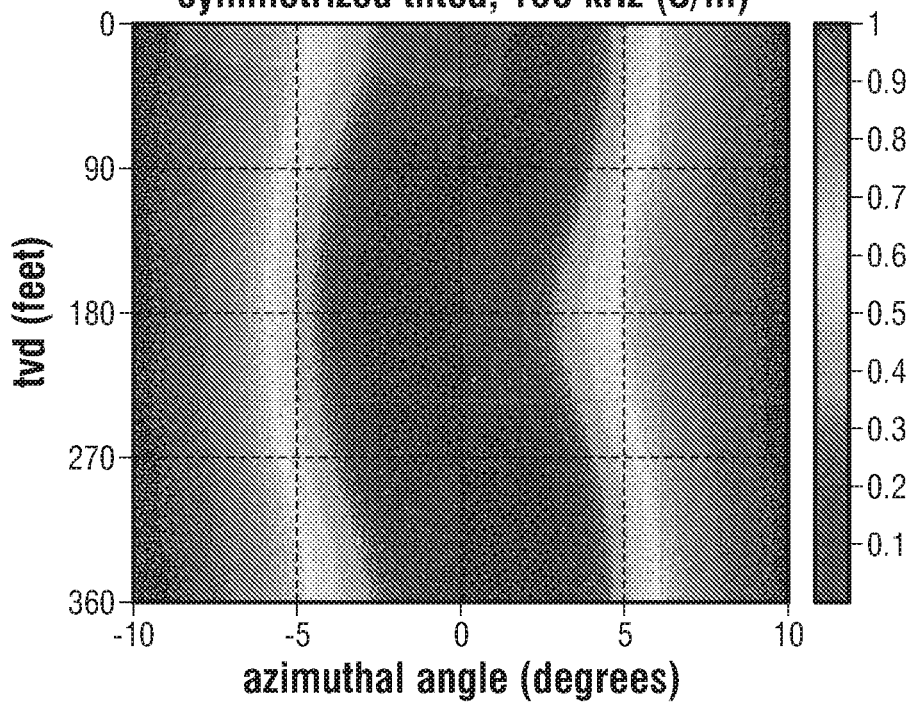

FIGS. 7A-7E and 8A-8E illustrate how such a type of imaging enables one to visualize the direction to an approaching structure. FIG. 7A shows the same formation as FIG. 4A and the formation of FIG. 8A is the same as that of FIG. 6A. Here again the measurement frequency is 100 kHz; the dip angle is 85 degrees. The curve plots (FIGS. 7B, 7D, 8B, 8D) depict the directional measurements as functions of the distance to bed boundary for azimuthal angles $\phi$ equal to 0, 90, and 180 degrees. FIGS. 7B, 7C, 8B, and 8C correspond to ratios of voltages in the same tilted receiver excited by two different axial transmitters, and FIGS. 7D, 7E, 8D, 8E correspond to ratios of the voltage in a tilted receiver and the voltage in an axial receiver excited by the same axial transmitter. The images (FIGS. 7C, 7E, 8C, 8E) depict the directional measurements as functions of the distance to bed boundary and the azimuthal angle $\phi$. They enable one to detect an approaching bed from a distance of a few feet, and to visualize its orientation.

Resistivity images of different quality may be obtained by using a full set or a limited set of data. In the following description, we use the notation $V_{T4R3}$ for the complex (phasor) voltage measured on receiver $R_3$ when transmitter $T_4$ is activated with a current of one ampere and the other transmitters are deactivated.

At least two types of images can be produced. Differential images show changes in conductivity and are useful to visualize the stratigraphy. The voltages $V_{T4R3}$ and $V_{T5R4}$, for example, can be used to generate a differential image. Directional images give an indication of the variation of conductivity around the tool as it rotates. A directional image is computed from information embedded in the ratios $V_{T4R3}/V_{T4R1}$ and $V_{T5R4}V_{T5R1}$. While these ratios are preferable, several other combinations would also give good results.

When constructing images from recorded-mode data (a full set), the dependence of the directional voltages $V_{T4R3}$ and $V_{T5R4}$ on the tool rotation angle $\phi$ is computed from:

$$V_{tilted}(\phi)=c_1+c_2\cos(\phi)+c_3\sin(\phi)+c_4\cos(2\phi)+c_5\sin(2\phi). \quad (18)$$

The Fourier coefficients c are stored in the downhole memory for each tool position. However, because of the limited bandwidth of typical downhole (e.g., mud-pulse) telemetry, the information that can be transmitted to the surface in real-time (or near real-time) while drilling is limited and must be greatly condensed. For imaging purposes, symmetrized measurements are preferable; the tilted-coil voltages are symmetrized by taking the geometric mean:

$$V_{symmetrized}(\varphi) = (V_{T5R4}(\varphi - 90)V_{T4R3}(\varphi))^{\frac{1}{2}} \quad (19)$$

As alluded to above, for ease of illustration, the magnetic moments of the tilted receivers are drawn in the plane of the paper in FIG. 3. In reality, coil $R_4$ is azimuthally rotated by 90 degrees; its magnetic moment has a transverse moment perpendicular to the paper. For this reason, we use the value of $V_{T5R4}$ when the tool rotation angle is $\phi-90$ in equation (19).

In many cases, the second-order terms in equation (18) may be neglected, leading to the same approximation as equation (1):

$$V_{symmetrized}(\varphi) \approx \frac{1}{2}(V_{up} + V_{dn}) + \frac{1}{2}(V_{up} - V_{dn})\cos(\phi - \phi_d). \quad (20)$$

The directional information transmitted to the surface can include the ratio $V_{up}/V_{dn}$ and the angle $\phi_d$, assuming the dip azimuth angle $\phi_d$ is estimated downhole. The representation in equation (20) requires two more data points to be transmitted for each tool position, i.e. two more real numbers. We discuss below generating images from such transmitted data, along with two additional data points, so as to use equation (20), and also using the recorded-mode Fourier coefficients for the two tilted receivers as in equation (18).

When the Fourier coefficients in equation (18) are available, the differential image can be obtained from the ratio:

$$\mathcal{R}_{differential}(\varphi) = \left(\frac{V_{T5R4}(\varphi - 90)}{V_{T5R4}(\varphi + 90)} \frac{V_{T4R3}(\varphi)}{V_{T4R3}(\varphi + 180)}\right)^{\frac{1}{2}}. \quad (21)$$

This ratio is insensitive to dip and anisotropy. To preserve a symmetric spatial response, we compute the fraction:

$$(\mathcal{F}_{differential}(\phi) = 2(\mathcal{R}_{differential}(\phi) - 1)/(\mathcal{R}_{differential}(\phi) + 1). \quad (22)$$

This fraction follows the Born approximation at low frequency or low conductivity. In particular, it has no horns at bed boundaries. It is re-normalized to conductivity units as follows:

$$S_{differential}(\varphi) = \frac{1}{K}\mathcal{F}_{differential}(\varphi), \quad (23)$$

where $$K = \frac{i}{2}\omega\mu D_1^2, \quad (24)$$

and $D_1$ is the distance T4R3 or T5R4 in meters. The conductivity is obtained from the formula:

$$\sigma_{differential}(\phi) = \text{real}\,(S_{differential}(\phi)) + \text{imag}(S_{differential}(\phi)), \quad (25)$$

which provides a first-order skin-effect correction. When the resistivity logging tool crosses a planar boundary between two uniform layers at a dip angle of 90 degrees, the peak reading on the differential image will approximate the difference between the conductivity of the two layers. Producing a differential image using equations (18)-(25) does not require calibration of the titled receiver coils R3 and R4.

For a directional image, the expression:

$$\mathcal{L}_{directional}(\varphi) = \frac{1}{2}\log\left(\frac{V_{T5R4}(\varphi - 90)}{v_{T5R1}}\right) + \frac{1}{2}\log\left(\frac{V_{T4R3}(\varphi)}{V_{T4R1}}\right) \quad (26)$$

is inverted for the conductivity σ by comparison with an analytic model. The model assumes point dipole coils in a homogenous, isotropic medium, to yield:

$$\mathcal{L}_{model} = ik(D_1 - D_2) + \log(1 - ikD_1) - \log(1 - ikD_2) \quad (27)$$

where $D_2$ is the distance T4R1 or T5R1 in meters. Here k is the propagation coefficient:

$$k = (\omega^2\varepsilon\mu + i\omega\mu\sigma)^{\frac{1}{2}}. \quad (28)$$

For the permittivity $\epsilon$, we use what is known in the industry as "the Schlumberger formula":

$$\epsilon = 5 + 108.5\sigma^{0.35}. \quad (29)$$

The voltages $V_{T5R1}$ and $V_{T4R1}$ in equation (9) are used as a reference signals. They do not depend on the rotation angle $\phi$ because the coils involved have coaxial magnetic moments.

As indicated above, while drilling, images are typically generated from a restricted set of data because of the limited data rate of mud-pulse telemetry. We use the approximation in equation (20) (repeated here) instead of the Fourier series in equation (18).

$$V_{symmetrized}(\varphi) = \frac{1}{2}(V_{up} + V_{dn}) + \frac{1}{2}(V_{up} - V_{dn})\cos(\phi - \phi_d). \quad (30)$$

When this approximation is used for the ratio $R_{differential}(\phi)$ in equation (21), we find:

$$\mathcal{F}_{differential}(\varphi) = 2\frac{V_{up}/V_{dn} - 1}{V_{up}/V_{dn} + 1}\cos(\phi - \phi_d). \quad (31)$$

A good quality differential image can be obtained using only the symmetrized ratio $V_{up}/V_{dn}$ and the angle $\phi_d$.

For a directional image, a similar approach can be applied. Equation (26) is replaced by:

$$\mathcal{L}_{symmetrized}(\varphi) = \log(V_{symmetrized}(\varphi)) - \frac{1}{2}\log(V_{T5R4}V_{T4R1}). \quad (32)$$

As stated above, to evaluate this expression, two additional data points are required in addition to the ratio and dip azimuth angle. When that information is not available, a further simplification is needed. Equation (30) is rewritten as:

$$V_{symmetrized}(\varphi) = \frac{1}{2}(V_{up} + V_{dn})\left[1 + \frac{V_{up}/V_{dn} - 1}{V_{up}/V_{dn} + 1}\cos(\phi - \phi_d)\right]. \quad (33)$$

The factor $$\frac{1}{2}(V_{up} + V_{dn})$$

is replaced by $$V_{model}^{D_1}(\sigma_{ARC}),$$

the voltage for two coaxial coils with spacing $D_1$ in a homogeneous isotropic medium with a conductivity $\sigma_{ARC}$, obtained from an axial transmitter/axial receiver resistivity log. For example, for the 400 kHz phase resistivity, $$V_{hybrid}(\varphi) = V_{model}^{D_1}(\sigma_{ARC})\left[1 + \frac{V_{up}/V_{dn} - 1}{V_{up}/V_{dn} + 1}\cos(\phi - \phi_d)\right]. \quad (34)$$

Instead of equation (32), we use $$\mathcal{L}_{hybrid}(\varphi) = \log(V_{hybrid}(\varphi)) - \log(V_{model}^{D_2}(\sigma_{ARC})). \quad (35)$$

Here $$V_{model}^{D_2}(\sigma_{ARC})$$

is the voltage for two coaxial coils with spacing $D_2$ in a homogeneous isotropic medium with conductivity $\sigma_{ARC}$. The image resulting from equation (35) is a compromise because it contains contributions from different depths of investigation. Calibration of the tilted-coil receivers is necessary to apply equation (26), but is not necessary when using equation (35).

Figure 9:
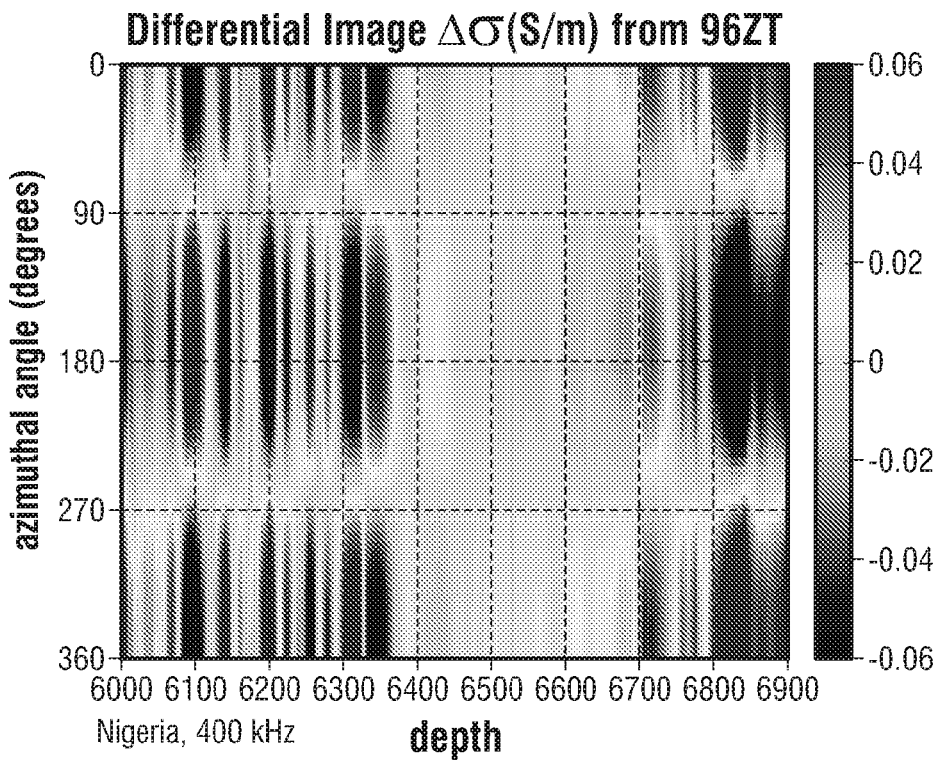
FIG. 9 is a differential image generated from the complete recorded mode data, in accordance with the present disclosure.
Figure 10:
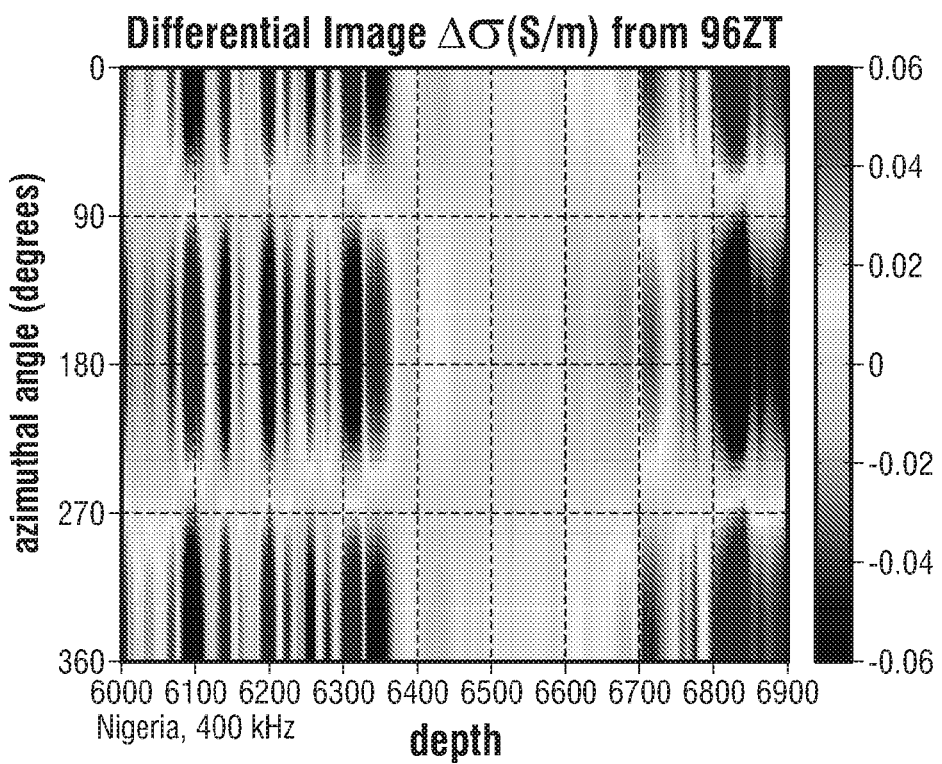
FIG. 10 is a differential image generated from data normally transmitted while drilling, without additional data points, in accordance with the present disclosure.

Results obtained from a field log in Nigeria are illustrated in FIGS. 9-16. The 400 kHz voltages of a directional propagation resistivity logging tool were used. FIG. 9 is a differential image generated from the complete recorded mode data via equation (22). The color scale is in conductivity units (S/m). The differential image in FIG. 10 was obtained from data normally transmitted while drilling, without additional data points, via equation (31). It is seen that FIG. 10 is more blurred and noisier than FIG. 9. However, the structural information is preserved.

Figure 11:
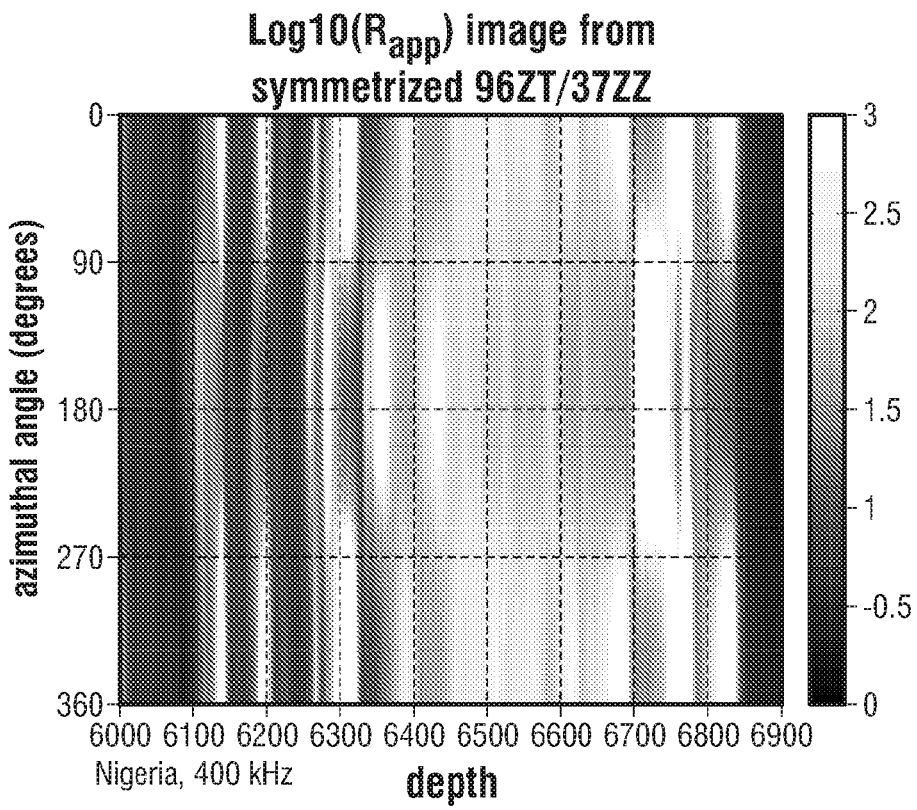
FIG. 11 is a directional image generated from the complete recorded mode data, in accordance with the present disclosure.
Figure 12:
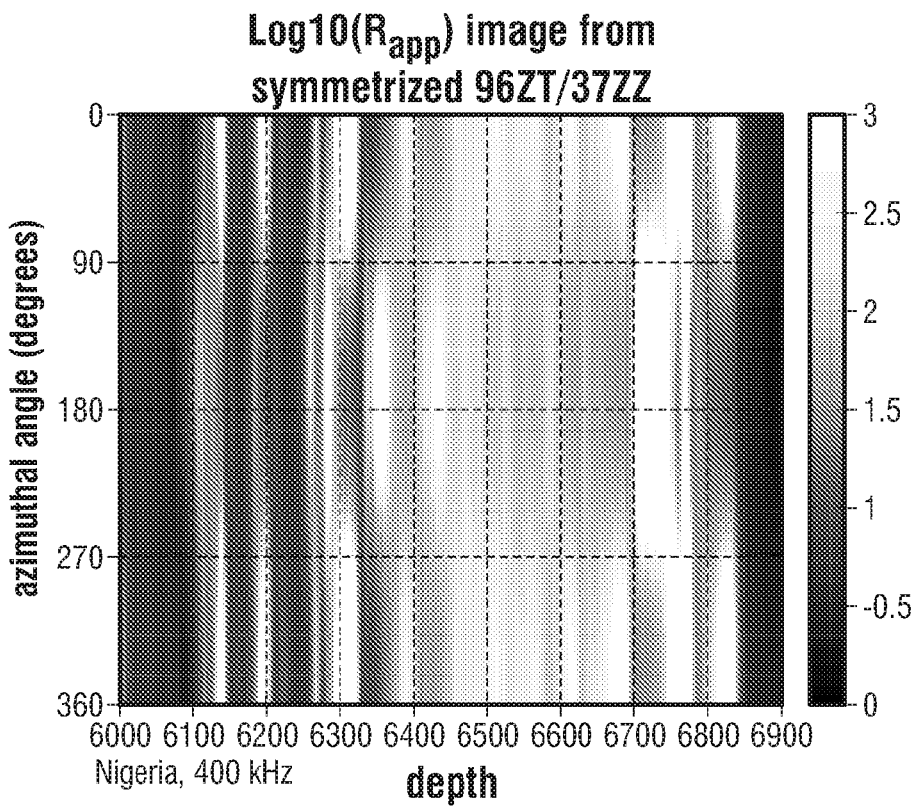
FIG. 12 is a directional image generated from data normally transmitted while drilling, without two additional data points, in accordance with the present disclosure.
Figure 13:
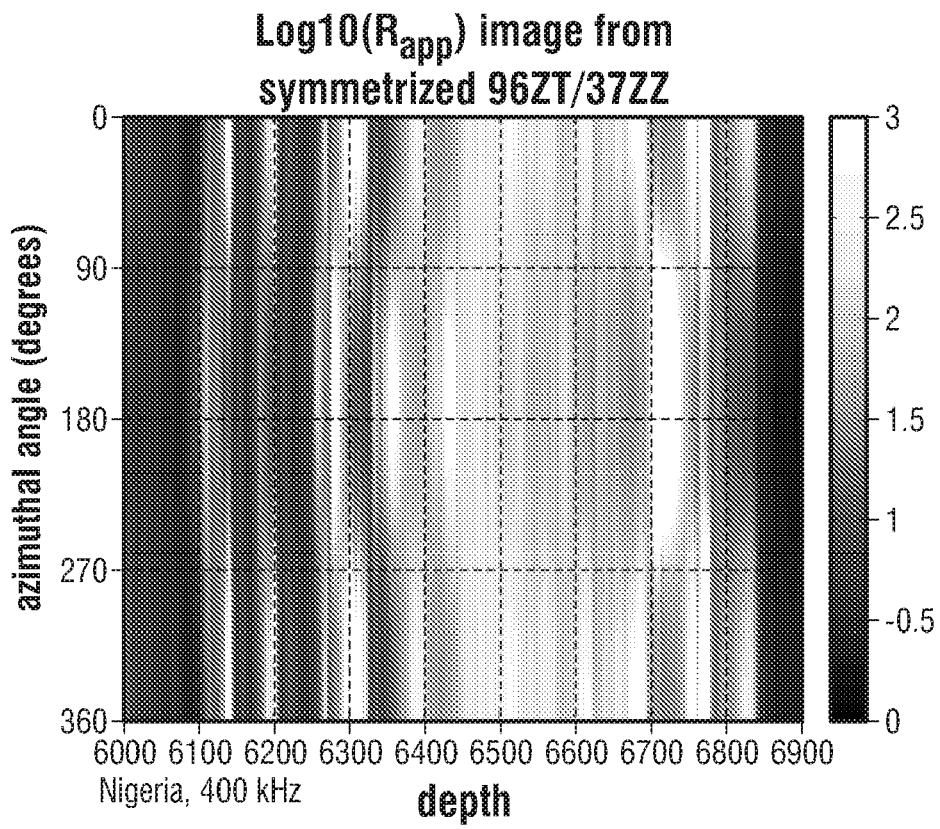
FIG. 13 is a directional image generated from data normally transmitted while drilling, without additional data points, in accordance with the present disclosure.

Directional images of the same interval are displayed in FIGS. 11-13. The color scale is logarithmic in resistivity (Ω-m). FIG. 11 is a directional image generated from the complete recorded mode data via equation (26). The directional image in FIG. 12 was obtained from data normally transmitted while drilling, with two additional data points, via equation (32). Without additional data points, via equation (35), we generated the image in FIG. 13. No loss of information is found when comparing FIG. 12 to FIG. 11, but FIG. 13 is significantly different.

Figure 14:
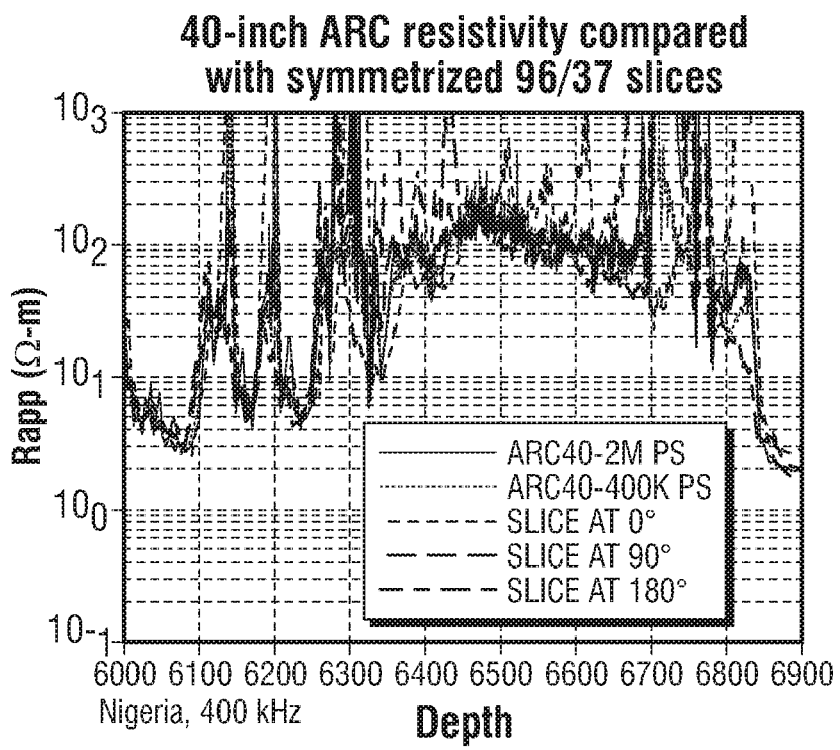
FIG. 14 shows slices (at 0, 90, and 180 degrees) of the directional image in FIG. 11 compared with standard axial transmitter/axial receiver resistivity logs.
Figure 15:
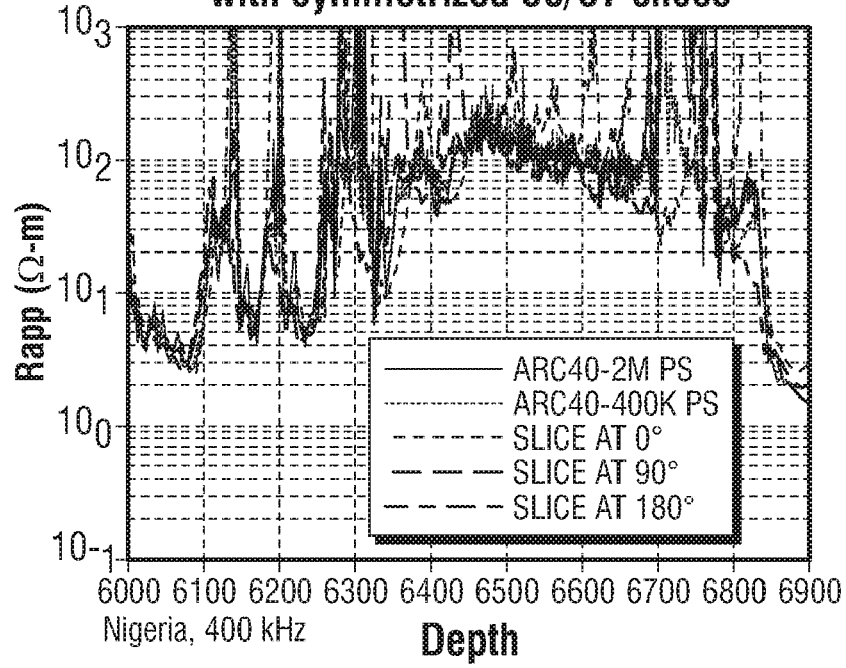
FIG. 15 shows slices (at 0, 90, and 180 degrees) of the directional image in FIG. 12 compared with standard axial transmitter/axial receiver resistivity logs.
Figure 16:
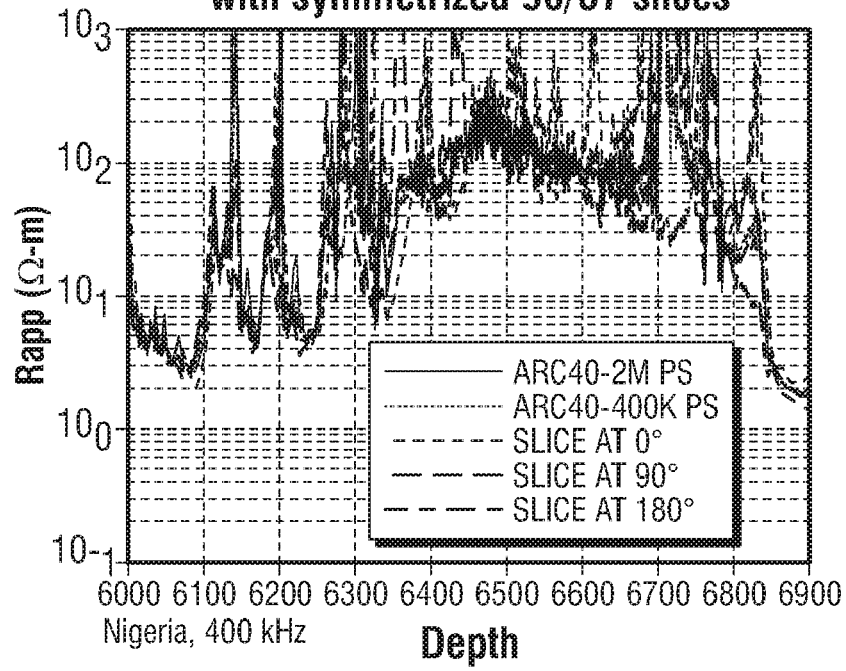
FIG. 16 shows slices (at 0, 90, and 180 degrees) of the directional image in FIG. 13 compared with standard axial transmitter/axial receiver resistivity logs.

FIG. 14 shows slices of the directional image in FIG. 11 compared with standard axial transmitter/axial receiver resistivity logs. Slices at 0, 90, and 180 degrees are plotted. The slices in FIG. 15 were obtained from the directional image in FIG. 12. They are obtained from data normally transmitted while drilling, with two additional data points, via equation (32). Slices obtained from FIG. 13 are compared to standard axial transmitter/axial receiver resistivity logs in FIG. 16. These slices are computed, without additional data points, via equation (35). The slices in FIGS. 14 and 15 are in quantitative agreement. FIG. 16 is quantitatively different but gives a useful indication of the resistivity profiles above and below the borehole. The data labeled "ARC-40 400 kHz PS data" was used in the hybrid approximation in equation (35), so the slice at 0 degrees is close to the "ARC-40 400 kHz PS" log in FIG. 16.

The array depicted in FIG. 1 has been used to explain different methods of producing resistivity images. The methods and techniques described herein are not limited to this coil layout, and can be adapted to other coil arrays containing axial coils and one or more tilted or transverse coils.

While preferred embodiments have been described herein, those skilled in the art, having benefit of this disclosure, will appreciate that other embodiments are envisioned that do not depart from the inventive scope of the present application. Accordingly, the scope of the present claims or any subsequent related claims shall not be unduly limited by the description of the preferred embodiments herein.

What is claimed is:

1. A method to produce an image of the resistivity of a subsurface formation using directional measurements, comprising:
   providing a downhole logging tool having one or more transmitters and one or more receivers, and being capable of making directional measurements;
   using the downhole logging tool to measure the voltage in a particular receiver due to a particular transmitter for one or more transmitter/receiver pairs, at least one of the voltage measurements comprising a directional measurement;
   for a particular transmitter, forming a first ratio of the voltage at a selected receiver and the voltage at another receiver;
   for any particular transmitter/receiver pair producing a directional measurement, forming a second ratio between the voltage at a particular rotation angle and the voltage at a rotation angle 180 degrees from the particular rotation angle; and
   using the first and second ratios to produce the image of the resistivity of the subsurface formation.

2. The method of claim 1, wherein the downhole logging tool is a wireline tool or a while-drilling tool.

3. The method of claim 2, further comprising making drilling decisions based on the image.

4. The method of claim 1, further comprising improving the bed-boundary response.

5. The method of claim 4, wherein improving the bed-boundary response comprises constructing a symmetrized measurement.

6. The method of claim 5, wherein constructing the symmetrized measurement comprises using a combination of directional measurements from two transmitter/receiver pairs having the same spacing.

7. The method of claim 6, wherein the using the combination of directional measurements comprises forming a symmetrized ratio using the first ratio from one transmitter/receiver pair and a second ratio from the other transmitter/receiver pair.

8. The method of claim 1, further comprising re-normalizing the measurements to conductivity units, and depicting the difference in conductivities between the near-tool matter and an approaching bed.

* * * * *